(12) United States Patent
Van Horn et al.

(10) Patent No.: US 8,676,664 B2
(45) Date of Patent: Mar. 18, 2014

(54) SYSTEM AND METHOD FOR ENHANCING BUYER AND SELLER INTERACTION DURING A GROUP-BUYING SALE

(75) Inventors: Tom Van Horn, Bellevue, WA (US); Dale A. Woodford, Redmond, WA (US); Richard A. Halbert, Redmond, WA (US); Kevin Dean Wampler, Bellevue, WA (US)

(73) Assignee: Intellectual Ventures Holding 79 LLC, Las Vegas, NV (US)

( * ) Notice: Subject to any disclaimer, the term of this patent is extended or adjusted under 35 U.S.C. 154(b) by 0 days.

(21) Appl. No.: 13/227,734

(22) Filed: Sep. 8, 2011

(65) Prior Publication Data

US 2011/0320362 A1    Dec. 29, 2011

Related U.S. Application Data

(62) Division of application No. 12/051,351, filed on Mar. 19, 2008, now Pat. No. 8,489,466, which is a division of application No. 09/596,921, filed on Jun. 19, 2000, now Pat. No. 7,363,246.

(51) Int. Cl.
*G06Q 30/00* (2012.01)

(52) U.S. Cl.
USPC .................. 705/26.2; 705/26.1; 705/26.4

(58) Field of Classification Search
USPC .............................. 705/26.1–27.2
See application file for complete search history.

(56) References Cited

U.S. PATENT DOCUMENTS

| | | |
|---|---|---|
| 3,581,072 A | 5/1971 | Nymeyer |
| 4,567,359 A | 1/1986 | Lockwood |
| 4,789,928 A | 12/1988 | Fujisaki |
| 4,949,248 A | 8/1990 | Caro |
| 5,148,365 A | 9/1992 | Dembo |

(Continued)

FOREIGN PATENT DOCUMENTS

| | | |
|---|---|---|
| WO | WO 00/11570 | 3/2000 |
| WO | WO 00/30004 | 5/2000 |

(Continued)

OTHER PUBLICATIONS

"Pricing strategies and technologies for on-line delivered content." Bichler, Martin ; Loebbecke, Claudia. Journal of End User Computing 12.2 (Apr.-Jun. 2000): 4-10. Retrieved via ProQuest on Oct. 15, 2013.*
U.S. Appl. No. 60/097,932, filed Aug. 25, 1998, Pallakoff.
U.S. Appl. No. 60/097,933, filed Aug. 25, 1998, Pallakoff.
U.S. Appl. No. 60/118,189, Ehrlich et al.
U.S. Appl. No. 09/249,727, filed Feb. 13, 1999, Ehrlich et al.
US 6,000,826, 12/1999, Parunak (withdrawn).

(Continued)

*Primary Examiner* — Michael Misiaszek
(74) *Attorney, Agent, or Firm* — Brundidge & Stanger. P.C.

(57) ABSTRACT

A method and system are provided that enable buyers and sellers to communicate with each other and to negotiate the purchase terms of featured merchandise in a group-buying opportunity. Sellers and buyers may use various forms of on-line group-buying mechanisms in conjunction with the negotiation features of the invention. Buyers may send various inquiries to sellers regarding merchandise offered for sale through the online group-buying sale. Sellers may respond to buyer questions and queries, and in some instances, sellers may communicate instructions to the on-line group-buying mechanism to alter the course of an on-line group-buying sale in progress, e.g., a further reduction in price. The method and system further provides a mechanism for calculating a demand curve based on received buyer offers and applying the demand curve to an on-line group-buying sale.

21 Claims, 21 Drawing Sheets

(56) References Cited

U.S. PATENT DOCUMENTS

| | | | |
|---|---|---|---|
| 5,255,184 | A | 10/1993 | Hornick et al. |
| 5,270,921 | A | 12/1993 | Hornick |
| 5,377,095 | A | 12/1994 | Meada et al. |
| 5,394,324 | A | 2/1995 | Clearwater |
| 5,576,951 | A | 11/1996 | Lockwood |
| 5,640,569 | A | 6/1997 | Miller et al. |
| 5,712,985 | A | 1/1998 | Lee et al. |
| 5,724,521 | A | 3/1998 | Dedrick |
| 5,727,165 | A | 3/1998 | Ordish et al. |
| 5,729,700 | A | 3/1998 | Melnikoff |
| 5,745,882 | A | 4/1998 | Bixler et al. |
| 5,758,327 | A | 5/1998 | Gardner et al. |
| 5,758,328 | A | 5/1998 | Giovannoli |
| 5,765,143 | A | 6/1998 | Sheldon et al. |
| 5,794,207 | A | 8/1998 | Walker et al. |
| 5,794,219 | A | 8/1998 | Brown |
| 5,797,127 | A | 8/1998 | Walker et al. |
| 5,799,284 | A | 8/1998 | Bourquin |
| 5,806,047 | A | 9/1998 | Hackel et al. |
| 5,809,144 | A | 9/1998 | Sirbu et al. |
| 5,818,914 | A | 10/1998 | Fujisaki |
| 5,826,244 | A | 10/1998 | Hubermann |
| 5,832,459 | A | 11/1998 | Cameron et al. |
| 5,835,896 | A | 11/1998 | Fisher et al. |
| 5,842,178 | A | 11/1998 | Giovannoli |
| 5,845,265 | A | 12/1998 | Woolston |
| 5,845,266 | A | 12/1998 | Lupien et al. |
| 5,873,069 | A | 2/1999 | Reuhl et al. |
| 5,890,137 | A | 3/1999 | Koreeda |
| 5,890,138 | A | 3/1999 | Godin et al. |
| 5,895,454 | A | 4/1999 | Harrington |
| 5,897,639 | A | 4/1999 | Greef et al. |
| 5,913,210 | A | 6/1999 | Call |
| 5,915,209 | A | 6/1999 | Lawrence |
| 5,950,176 | A | 9/1999 | Keiser et al. |
| 5,956,709 | A | 9/1999 | Xue |
| 5,983,199 | A | 11/1999 | Kaneko |
| 5,999,914 | A | 12/1999 | Blinn et al. |
| 6,012,045 | A | 1/2000 | Barzilai et al. |
| 6,021,398 | A | 2/2000 | Ausubel |
| 6,026,383 | A | 2/2000 | Ausubel |
| 6,032,125 | A | 2/2000 | Ando |
| 6,038,554 | A | 3/2000 | Vig |
| 6,041,308 | A | 3/2000 | Walker et al. |
| 6,049,774 | A | 4/2000 | Roy |
| 6,078,897 | A | 6/2000 | Rubin et al. |
| 6,085,169 | A | 7/2000 | Walker et al. |
| 6,098,051 | A * | 8/2000 | Lupien et al. ............... 705/36 R |
| 6,101,484 | A | 8/2000 | Halbert et al. |
| 6,141,653 | A | 10/2000 | Conklin et al. |
| 6,141,666 | A | 10/2000 | Tobin |
| 6,260,024 | B1 | 7/2001 | Shkedy |
| 6,269,343 | B1 | 7/2001 | Pallakoff |
| 6,324,522 | B2 | 11/2001 | Peterson et al. |
| 6,418,415 | B1 | 7/2002 | Walker et al. |
| 6,473,740 | B2 | 10/2002 | Cockrill et al. |
| 6,493,722 | B1 * | 12/2002 | Daleen et al. ........................ 1/1 |
| 6,516,302 | B1 | 2/2003 | Deaton et al. |
| 6,587,838 | B1 | 7/2003 | Esposito et al. |
| 6,598,026 | B1 | 7/2003 | Ojha et al. |
| 6,631,356 | B1 | 10/2003 | Van Horn et al. |
| 6,876,983 | B1 | 4/2005 | Goddard |
| 7,287,007 | B1 | 10/2007 | Detering |
| 7,389,262 | B1 * | 6/2008 | Lange ............................... 705/37 |
| 2001/0014868 | A1 * | 8/2001 | Herz et al. ....................... 705/14 |
| 2002/0013631 | A1 | 1/2002 | Parunak et al. |
| 2005/0055306 | A1 * | 3/2005 | Miller et al. ..................... 705/37 |
| 2005/0177402 | A1 | 8/2005 | Walker et al. |
| 2011/0119172 | A1 * | 5/2011 | Alsberg et al. ................. 705/37 |

FOREIGN PATENT DOCUMENTS

| | | |
|---|---|---|
| WO | WO 00/30005 | 5/2000 |
| WO | WO 00/34841 | 6/2000 |
| WO | WO 00/34842 | 6/2000 |
| WO | WO 00/34843 | 6/2000 |
| WO | WO 00/34886 | 6/2000 |
| WO | WO 00/45318 | 8/2000 |

OTHER PUBLICATIONS

Buying Time: Real and Hypothetical Offers. V. Kerry Smith and Carol Mansfield. Journal of Environmental Economics and Management, Jul. 1998. Retrieved via ProQuest on Oct. 25, 2007.

Search Report for PCT/US01/19013 dated Nov. 15, 2001.

Search Report date Aug. 24, 1999 for U.S. Appl. No. 09/270,219.

Search Report dated Sep. 8, 1999 for U.S. Appl. No. 09/281,859.

Search Report dated Nov. 22, 1999 for U.S. Appl. No. 09/409,277.

Dialog, The Gale Group newsletter, "New Twist to Online Shopping: Service Hopes and Break Customer Apathy," Internet week, 1(7), May 22, 1995.

Dialog, "New Tricks in Pet Supplies" by Minkoff, J. Discount Merchandiser 34(12) 70-72, 1994.

Online Document from Software Patent Institute Database of Software Technology, http://m.spi.org/, Record 1: "Management Data Processing," Serial No. acmr6512.0039, Printed Sep. 20, 1999.

Online Document from Software Patent Institute Database of Software Technology, http://m.spi.org/,Record 2: "Management Science," Serial No. ACMGCL89, 1066, Printed Sep. 20, 1999.

Online Document from Software Patent Institute Database of Software Technology, http://m.spi.org/ Record 17: "Distribution Resource Planning," Serial No. HPAPPS.2620, Printed Sep. 20, 1999.

Online Document from IBM Intellectual Property Network, http://www.patents.ibm.com/, Titled: Personalized Optimized Decision/Transaction Program, Jan. 1995, Reprinted Nov. 24, 1999.

Online Document from Agorics, Inc., http://www.agorics.com/, Sections: "A Survey of Auctions," "English Auction," "A Dutch Auction," "The First Price Auction," "The Vickrey Auction," "The Double Auction," "Auction Offshoots," "Auction Strategies," "Auction Histories," "Government Securities—Auctioned off," "Collusion in Auctions," "Auction Bibliography," Dated 1996, Reprinted Oct. 25, 1999.

Online Document from Forbes.com, http://www.forbes.com, Forbes Global, Computer Science Section of Dec. 28, 1998, "Coming Soon—Cyber Co-Ops" by Karlgaard, Printed Nov. 16, 1999.

Management and Specialist Team, LetsBuyIt.com, http://www.euroferret.com, Jan. 15, 1999; Online Document, http://www.alumni.se/e-commerce/default.htm, Jan. 15, 1999, Printed Nov. 19, 1999.

Online Document from Bid.com, http://www.bid.com/dutch, Printed Sep. 3, 1999.

Online Document from Bullnet Online Auctions, http://www.bullnet.co.uk/auctions/info.htm, Printed Sep. 3, 1999.

Online document from Who's Who for the Commerce Standard, http://www.gii.com/standard/who/index.html, Printed Nov. 19, 1999.

Online Document from Cooperative Educational Service Agency, htto://www.cesa5.k12.us/buyimg.htm, Printed Sep. 20, 1999.

Online Document from Franklin Regional Council Governments, http://www.frcog.or/purch.html, Printed Sep. 20, 1999.

Online Document from Klik-Klok Online Dutch Auction, http://www.klik-klok.com/how.htm, Printed Sep. 3, 1999.

Online Document, ComputerSweden, "Icon-grundare satsar narmare halv miljard pa e-handel," http:nyheter.idg.se, Jan. 23, 1999 (w/English translation).

Online Doument from Artiklar fran AffarsData ("Resume"), http://www.ad.se, Feb. 25, 1999 (w/English translation).

Online Document from ComputerSweden, "Lke;; Spangberg . . . ," http://hyheter.idg.se, Mar. 3, 1999.

Online Document from Accompany: About Team, http://www.ac-company.com/about_press_faq.asp, Printed Mar. 3, 1999.

Online Document from Accompany: About Us, http://www.accompany.com/about_press_0.asp, Printed, Mar. 3, 1999.

Online Document from Accompany: About Team, htto://www.ac-company.com/about_team.asp, Printed, Mar. 3, 1999.

(56) References Cited

OTHER PUBLICATIONS

Online Document from Accompany: About Team Advisors, http://www.accompany.com/about_team_advisors.asp, Printed, Mar. 3, 1999.
Online Document from Accompany: About Team, http://www.accompany.com/about_press_analyst.asp, Printed Mar. 3, 1999.
Online Document from Accompany: About Team Advisors, http://www.accompany.com/about_teampartners.asp, Printed Mar. 3, 1999.
Online Document from Accompany: Contact, http://www.accompany.com/about_contact.asp, Printed Mar. 3, 1999.
Online Document from Ask Reggie Domain Search, Accompany.com Domain Contacts, http://www.askreggie.com, Printed Mar. 3, 1999.
Online Document from Accompany: About Us, http://www.accompany.com/about_press_background.asp, Printed Mar. 3, 1999.
Online Document from ZDNN, http://www.zdnet.com/stories/news, Printed Mar. 3, 1999.
NewsAlert, "Accompany, Inc. to Revolutionize Commerce; Buys Come Together for Best Value," http://www.accompany.com, Printed Mar. 3, 1999.
Online Document from Yahoo, "Web startup pushes volume shopping," http://dailynews.yahoo.com, Printed Mar. 4, 1999.
Internet World (Mecklermedia), Cliff Figallo, "hosting Web Communities," Building relationships, Increasing Customer Loyality, and Maintaining a Competitive Edge. Published by John Wiley & Sons, Inc., Copyright 1998.
Abstract. World Reporter, Dagens Industri, "Expected success for internet shopping," WL 5900897, Mar. 12, 1999.
Article from Sportfak, "Letsbuyit.com Kommer," Feb. 12, 1999. (w/English translation).
IBM Technical Disclosure Bulletin, "Mult-product Delivery System Optimization Procedure," 38(4): 502-503, Apr. 1995.
Kroll et al., "World Weary Web," Forbes, Dec. 28, 1998, pp. 98-100.
Pant et al., "Business on the Web: Strategies and Economics," Fifth International WWW Conference, May 6-10 1996, Paris, France.
Rockoff et al., Design of an Internet-based System for Remote Dutch Auctions. Internet Research: Electronic Networking Applications and Policy, 5(4): 10-16, 1995.
Stang et al., "Scans" Sections, Wired, Sep. 1995, pp. 51,54,56, and 58.
Woolley, "Price War!," Forbes, Dec. 14, 1998, pp. 182 and 184.
Online Document from OCM, http://www.cynric.org/OCM/administration/management/services/coop.html, Printed Sep. 20, 1999.
Online Document from Dagens Industri, "Rush into Net-shopping," http://www.di.se/Scripts/, Document dated Mar. 12, 1999, Printed Jan. 19, 2000 (with English translation).
Online Document, "US-IL-Chicago—Cargo Revenue Management Analyst," "US-IL-Chicago—Revenue Manager," "US-In-Indianapolis—Yield Analyst," "US-CA-San Jose—Financial Analyst," http://jobsearch.monster.com, Printed Mar. 24, 1999.
Online Document from hotjobs.com, "Filenet Corporation," http://www.hotjobs.com, Printed Mar. 24, 1999.
Online Document from The Revenue Management Home Page, "Revenue Management Defined," wysiwyg://212/http://www.geocities.com/VVallStreet/Floor/4921/, Printed Mar. 18, 1999.
Online Document from the Revenue Management Home Page, "Articles on Revenue Management," wysiwyg://212/http://www.geocities.com/WallStreet/Floor/4921/articles.htm, Printed Mar. 18, 1999.
Online Document from the Revenue Management home Page, "Companies Practicing Revenue Management," wysiwyg://212/http://www.geocities.com/WallStreet/Floor/4921/rmcomps.htm, Printed Mar. 18, 1999.
Online Document from Revenue Management Systems, Inc., "What is Revenue Management?" http://www.revenuemanagement.com/whatisrm.htm, Printed Mar. 19, 1999.
Online Document from profitoptim.com, "Definition of Revenue Management," http://www.profitoptim/com/papersdirectory/rmdaybrief/sld063.htm, Printed Mar. 19, 1999.
Online Document from profitoprim.com, "What is revenue management (cont.)?" http://www.profitoptim.com/papersdirectory/resexpo97/sld006.htm, Printed Mar. 19, 1999.
Online Document from American Way, "How Airline Pricing Works," http://aa.com/away/Vantage/Vantage-may98.htm, Printed Mar. 18, 1999.
Online Document from Airline Discount, http://faculty.darden.edu/pfeiferp/airline.htm, Printed Mar. 18, 1999.
Online Document from the Innovation Network, "1994 Innovation Collection," http://198.49.20.47/texis/si/sc/i...e/+KoeMUi3WwBme+It0X0www/full.html, Printed Mar. 19, 1999.
Online Article by W. Lieberman of Veritec Solutions, Inc., "Yield Management: System or Program?" http://www.veritecsolutions.com, Site visited on Mar. 19, 1999.
Online Article by W. Lieberman of Veritec Solutions, Inc., "Making Yield Management Work for You: Ten Steps to Enhanced Revenues," http://www.veritecsolutions.com, Site visited on Mar. 19, 1999.
Online Article by W. Lieberman of Veritec Solutions, Inc., "Debunking the Myths of yield management" http://www.veritecsolutions.com, Site visited on Mar. 19, 1999.
Online Document from StoreSearch Internet Shopping Guide, http://www.storesearch.com, Site visited on Aug. 31, 1999.
Online Document from Netscape Netcenter, http://shop.netscape.com/auctions/main.adp, Site visited on Aug. 31, 1999.
Online Document from Yahoo! Auctions, http://auctions.yahoo.com/, Site visited on Aug. 31, 1999.
Online Document from Lycos: Sales & Specials http://www.lycos.com/Shopping/sales_and_specials/. Site visited on Aug. 31, 1999.
Hutchinson, "E-Commerce: Building a Model," Communications Week, pp. 57060, Mar. 17, 1997.
M2 Communications, "Icentral Inc.: Web Retailers Band Together to Build Traffic and Sales," m2 Presswire, Feb. 25, 1997.
Berryman et al., "Electronic Commerce: Three Emerging Strategies," McKinsey Quarterly, No. 1, pp. 152-159, 1998.
"BuyItOnline Revolutionizes Internet Retailing for Small Business Merchants," Business Wire, Sep. 8, 1998.
Press Release from MobShop, formerly known as Accompany, Inc., obtained from the internet at http://www.mobshop.com/press_release?release=20 on April 10, 2000, which explains that Accompany, Inc. received a Notice of Allowance from the U.S. Patent and Trademark Office.
Press Release from iCoop, Inc. obtained from the Internet at iCoop.com, Inc. has filed two patent applications and has provisional patent applications which were filed on Jan. 22, 1999.
Press Release from beMANY! obtained from the Internet at htto://www.bemany.com/press0211200_bemany.html on Apr. 10, 2000, which explains that beMANY! has a "patent pending process".
Press Release from the company BazaarE.com obtained from the Internet at http://www.bazaare.com/pr_03111999.com?CFID=62916&CFTOKEN=75630214 on Apr. 10, 2000, which explains that BazaarE.com has a "patent pending process".
Bailey et al., "An Exploratory Study of the Emerging Role of Electronic Intermediaries," International Journal of Electronic Commerce, 1(3) : 7-20 (1997).
"Retail Federation Group Buying," HFD—The Weekly Home Furnishing Newspaper, v0, n0, p9, Dec. 26, 1994.
"Frontier Rings Up a Sale with National Retail Federation," PR Newswire, p119NYM057, Jan. 19, 1998.
NRF: home page on World Wide Web (National Foundation Launches Site), The Weekly Newspaper for the Home Furnishing Network, v70, n42, p. 10(1), Oct. 14, 1996.
"Retail Federation Group Buying Set," HFD—The Weekly Home Furnishings Newspaper, v68, n52, p. 9(1), Dec. 26, 1994.
"Mosher Views ARA as Survival Kit for Small Specialy Stores," Daily News Record, v24, n22, p. 4(1), Feb. 2, 1994.
"KMART Targets GE as EDI Provider Signals GE's Re-Commitment to EDI," EDI News, v11, n21, Oct. 13, 1997.
"National Retail Federation Selects GE Information Services for EDI Service Partnership," PR Newswire, p1006DCM009, Oct. 6, 1997.
Mielczarski, W.; Michalik G.; Wodjaja, M.; "Bidding strategies in electricity markets," PIC Proceedings of the $21^{st}$ 1999 IEEE Internationals Conference, pp. 71-76, May 16-21, 1999, Cat. #99CH36351, 1999.

(56) References Cited

OTHER PUBLICATIONS

Online document from Savvio.com, "Savvio.com: Our Story," wysiwya://8/http://www.savvio.com/about/aboutUs.jsp, printed Sep. 28, 2000.

Dialog, The Gale Group Newsletter, "In Year 2020, Auctions and Agents to Rule Web," Newsbytes, Mar. 23, 1998.

U.S. Appl. No. 09/270,219, entitled "Demand Aggregation Through Online Buying Groups," filed Mar. 15, 1999, which is assigned to a common assignee.

U.S. Appl. No. 09/409,237, entitled "System and Method for Extension of Group Buying Throughout the Internet," filed Sep. 30, 1999, which is assigned to a common assignee.

U.S. Appl. No. 09/475,408 entitled "Demand Aggregation Through online Buying Groups," filed Dec. 30, 1999, which is assigned to a common assignee.

U.S. Appl. No. 09/497,373, entitled "Method and Apparatus for Creating and Managing Groups for Increasing Buying Power on the World Wide Web," filed Feb. 3, 2000, which is assigned to a common assignee.

U.S. Appl. No. 09/519,023, entitled "Dynamic Market Equilibrium Management System, Process and Article of Manufacture," filed Mar. 3, 2000, which is assigned to a common assignee.

U.S. Appl. No. 60/206,566 entitled "System and Method for Attaining Product Inventory Grouping for Sales in a Group-Buying Environment," filed May 23, 2000.

U.S. Patent No. 6,101,484, which issued on Aug. 8, 2000 in the names of Richard V. Halbert, Niklas Gustafsson and John M. Thrun, entitled "Dynamic Market Equilibrium Management System, Process and Article of Manufacture," formerly U.S. Appl. No. 09/281,859.

* cited by examiner

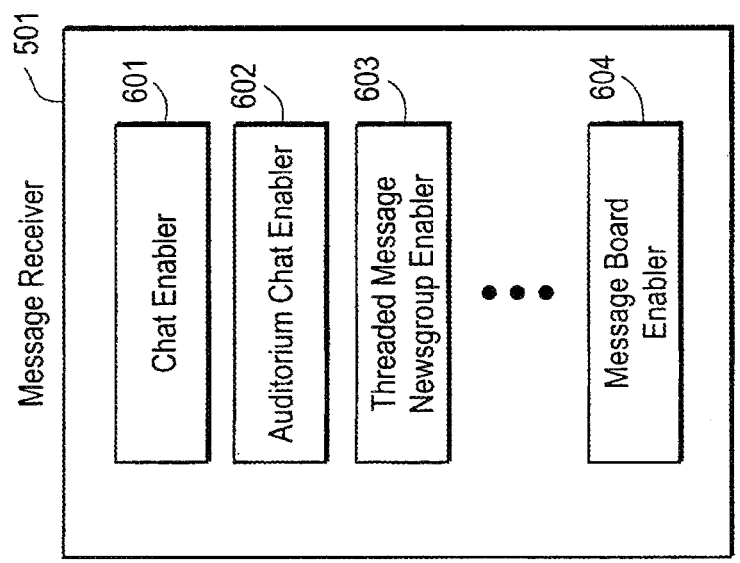

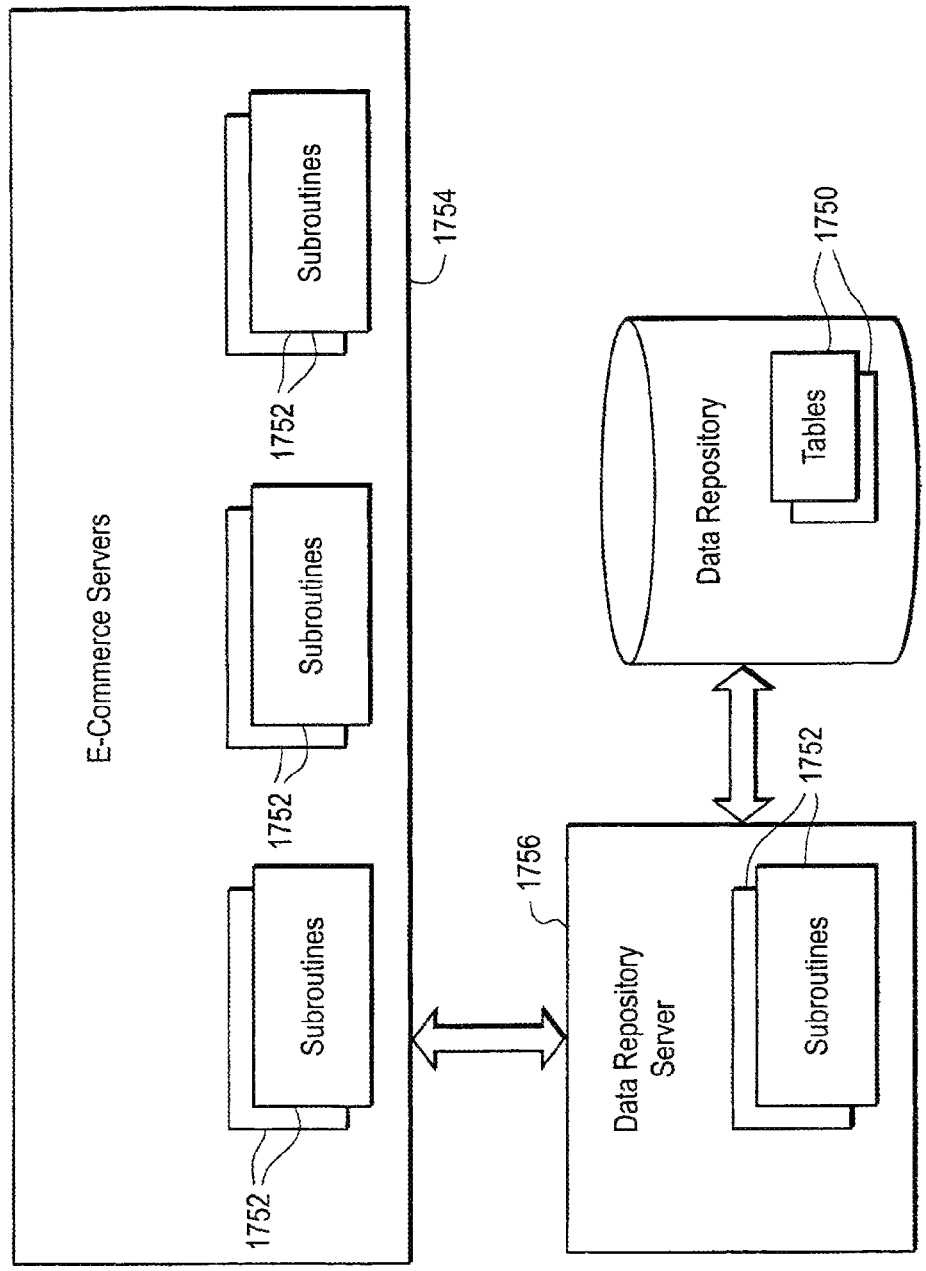

SYSTEM AND METHOD FOR ENHANCING BUYER AND SELLER INTERACTION DURING A GROUP-BUYING SALE

RELATED APPLICATION INFORMATION

The present application is a divisional application of U.S. patent application Ser. No. 12/051,351, "SYSTEM AND METHOD FOR ENHANCING BUYER AND SELLER INTERACTION DURING A GROUP-BUYING SALE," naming Tom Van Horn, Dale A. Woodford, Richard V. Halbert, and Kevin Dean Wampler as the inventors, filed Mar. 19, 2008; which application is a divisional application of U.S. Ser. No. 09/596,921, "SYSTEM AND METHOD FOR ENHANCING BUYER AND SELLER INTERACTION DURING A GROUP-BUYING SALE," naming Tom Van Horn, Dale A. Woodford, Richard V. Halbert, and Kevin Dean Wampler as the inventors, filed Jun. 19, 2000, now U.S. Pat. No. 7,363,246, issued Apr. 22, 2008; the present application claims the benefit of priority dates of the above-listed applications, the entireties of which are hereby incorporated by reference.

FIELD OF INVENTION

The present invention relates to the expansion of group-buying over electronic networks, such as the Internet, through a negotiation facility that allows greater communication among individual buyers and between buyers and merchandise sellers in conjunction with group-buying sales. Embodiments of the invention, which may interact with an on-line group-buying mechanism that aggregates buyer demand for merchandise, provide enhanced, real-time communication among the members of buying groups and among aggregated buyers and sellers.

BACKGROUND OF THE INVENTION

As shown in FIG. 1, a conventional store 100 is simply a collection of products 120. As shown in FIG. 2, a mall 240, of course, is a collection of stores 100. In the traditional retail environment, the buyers (or consumers) 160 have had to come to the seller's pre-selected and pre-priced collection of products 120 in order to make a purchase.

BENEFITS OF THE INVENTION

An on-line group-buying mechanism 380, such as that shown in FIG. 3, transforms the point of sale from a collection of products 120 into a collection of buyers 160. The on-line group-buying mechanism 380 further permits the formation of buyer groups across any number of electronic network sites (e.g., the Internet) linked to the electronic presence of a business entity implementing such a mechanism.

By creating a means to globally aggregate a large number of buyers in one place at one time, the on-line group-buying mechanism 380 may enable a significant shift in power from the seller(s) of goods and services to the buyer(s) of those goods and services. For example, on-line group-buying mechanisms 380 often enable buyers to achieve volume discounts in purchase price. In addition, rather than requiring buyers to choose between sellers' pre-selected and unilaterally pre-priced merchandise, as is the case with conventional on-line and off-line stores, some embodiments of on-line group-buying mechanisms 380 permit buyers to join together to influence which products sellers offer for sale and further allow each buyer to establish his or her own maximum price at which he or she is willing to purchase a featured item.

Buyers may be further empowered by certain other features of the on-line group-buying mechanism 380. Some embodiments of on-line group-buying mechanisms 380 permit buyers and potential buyers to increase sales volume (and further reduce prices) by posting messages to other potential buyers, such as on merchandise-specific message boards and in e-mail messages to people the buyer or potential buyer knows who might be interested in joining the buying group. In this way, every buyer or potential buyer may help the buying group attain optimal buying power. In addition, the methods through which some on-line group-buying mechanisms permit buyers to influence which products, brands, and services will be offered in future buying groups, may in some cases enable groups of buyers to create viable markets around particular featured items.

Other advantages of on-line group-buying mechanisms are discussed in a related pending, commonly owned application filed Mar. 15, 1999 in the names of Tom Van Horn, Niklas Gustafsson and Dale Woodford, entitled "Demand Aggregation Through Online Buying Groups," U.S. application Ser. No. 09/270,219, the disclosure of which is hereby incorporated by reference.

In some instances, on-line group-buying mechanisms 380 may provide only a limited ability for individual or aggregated buyers to negotiate electronically with sellers regarding merchandise features, price and other matters relevant to a given purchase. While individual buyers participating in an on-line group-buying sale may influence the purchase price of a featured item simply by joining a buying group (and thereby adding incremental volume to support a further price discount), the buyers may not have the ability to negotiate price, merchandise features, or other matters relevant to a given purchase directly with the seller(s) at or near the point of sale. Similarly, sellers may not have a means to respond in real time to buyer questions about featured merchandise or the ability to persuade an audience of buyers (e.g., a virtual buyer audience) why its featured item is superior to competing brands. Accordingly, in some instances, aggregating buyer demand in the sale of a featured item, especially over an electronic network, may be hindered from attaining its full potential if buyers and sellers cannot effectively communicate with one another to discuss merchandise features and negotiate prices.

Embodiments of the invention may make an on-line group-buying mechanism more effective by creating live, real-time interactions among buyers and sellers to enable buyers and sellers to discuss merchandise features, competing products and relevant prices during the course of the group-buying opportunity. Embodiments of the invention thus provide a method and apparatus to encourage and enable all buyers interested in a particular featured item during a given time frame to communicate within the buying group formed to accomplish the desired purchase in order to help optimize the potential bargain for both buyers and sellers.

Embodiments of the invention may empower buyers by further enabling individual buyers and potential buyers to discuss featured items and sales prices with each other and to negotiate the purchase terms of such featured items with the sellers. Such negotiations may benefit buyers by leading to lower prices, additional merchandise features, and/or better deals. Embodiments of the invention also provide a method and apparatus that allows real-time communications among buyers which may enhance each buyer's and potential buyer's opportunities to increase the level of buyer participation within a given buying group (e.g., to increase buying power of the group), as well as possibly defining the particular featured item ultimately to be purchased by the group by persuading other buyers of the desirability of particular features, extended warranty coverage or the like. In addition, the enhanced communications among buyers made possible by the invention may permit buyers to quickly and efficiently form subgroups of similarly situated buyers based on alternative merchandise or available purchasing options (e.g., a buyer could poll other interested buyers to help establish a market around his own preference for the addition of a particular accessory to be sold with the featured item). Embodiments of the invention may further allow buyers to more quickly and easily initiate the formation of any number of special interest groups, and may significantly enhance the ability of buyers to join together and define common interests sufficient to create a market for a particular product or service that would be of interest to a product manufacturer or service provider. These and other embodiments of the invention may enhance the sense of community sometimes associated with the group-buying experience.

The negotiations between buyers and sellers enabled by the invention may also provide significant benefits to sellers. First, the ability to communicate directly with an audience of interested buyers at or near the point of sale may enable sellers to increase sales by making knowledgeable and effective pricing and product offering choices in real time based on the specific preferences and sensitivities expressed by the group. In addition, the ability to answer questions and respond to buyer misconceptions about a featured item at or near the point of sale may increase sales and improve overall customer satisfaction with the seller and its merchandise. Finally, the sellers' interaction with buyers and potential buyers permitted by the invention may provide sellers with a new way to test-market merchandise and better understand the motivations underlying purchasing behavior of their customers.

Other ways in which this invention provides unique benefits to buyers and sellers and on-line businesses are set forth in various parts of this document below.

SUMMARY OF THE INVENTION

Definitions

Buyer—a person who participates in an on-line group-buying sale, such as a buyer who accesses an on-line group-buying mechanism from an operator's main site or from a Partner site, and including prospective buyers.

Display—to show visually or audibly a featured item offered in an on-line group-buying sale, such as a Partner site providing a link to a page on the operator's main site. A page is typically a specific portion of the totality of the operator's main site and does not necessarily refer to any particular method of displaying the page to a viewer/buyer. Of course, the featured item may be displayed on any type of display device, including a computer monitor, a telephone, a portable computer, a pager, and a television.

Electronic Network—an electronic communication medium across which sellers and buyers may communicate. Representative electronic networks include the Internet, intranets, the public switched telephone network ("PSTN"), wireless voice and data networks, and television networks, such as satellite, broadcast, cable television, and two-way interactive cable. Electronic networks further include hybrid systems, such as those in which sellers communicate to buyers via one medium, such as cable television, and buyers communicate to sellers via another medium, such as the Internet. Electronic networks additionally include aggregated electronic networks, such as when buyers communicate to sellers via multiple media, such the Internet, the telephone, and cable television.

Featured Item—a product or service, or groups of products and services, offered for sale in an on-line group-buying sale. Services may include any type of service, such as product service agreements, one-time services like vacations, and semi-permanent services, such as janitorial services. Featured Items may also include a bundle of products/services, such as a DVD player, a case, an extended warranty, one-year theft insurance, and two free DVDs. For bundled featured items, demand aggregation in an on-line buying group need not necessarily arise on specific items in the bundle or identical purchases of the full bundle but may also arise in a piecemeal fashion via purchases of individual items or subsets of items within the bundle, which may potentially increase the volume discount on any or all items within the bundle and/or purchases of the bundle as a whole.

Flash Demand Curve—A demand curve principally associated with an on-line group-buying sale conducted in a negotiating room. A flash demand curve typically allows a seller to receive real-time data updated continuously or at intervals (e.g., at 5-minute increments) or upon user request that shows the demand for a featured item based on irrevocable or non-irrevocable purchase offers from prospective buyers participating in an ongoing group-buying sale for a featured item. A flash demand curve may also be known as an instantaneous offer curve since in some embodiments, the flash demand curve may be produced from received offers from buyers and prospective buyers. In some embodiments, a flash demand curve differs from a conventional demand curve in that the flash demand curve is not necessarily comprised of irrevocable offers. In addition, in some embodiments, a flash demand curve comprises offers collected in a short time interval and/or during an ongoing sale and/or from a specific set of prospective buyers. The short time interval for a flash demand curve may provide sellers with highly accurate data regarding the demand for the featured item among the buyers associated with an on-line group-buying sale at the instance of the sale and/or prior to the actual sale, allowing sellers to react to such information by potentially altering (e.g., lowering) prices and/or by adding additional merchandise or accessories to compete with other sellers.

Negotiating Room—a facility configured to allow at least one seller and at least one buyer to communicate with each other via electronic networks about a featured item associated with an on-line group-buying sale. The communications between the seller(s) and buyer(s) may be conducted in a variety of formats, even during the same on-line group-buying sale. In a preferred embodiment, the negotiating room is a virtual facility in which buyers accessing an on-line group-buying sale via multiple platforms across an electronic network may negotiate the specific terms of a purchase with at least one seller. For example, the negotiating room may use chat room formats, such as auditorium or stage room chat formats. As an ordinarily skilled artisan will recognize, the negotiating room may also comprise a hybrid system that combines aspects of a virtual facility with a physical facility, e.g., some buyers could access a seller from a studio audience equipped with electronic polling and/or offer capabilities, while other buyers join the same buying group by accessing the same seller via computers, telephones, and portable computers, personal digital assistants, and hand-held computers.

Negotiating Room On-Line Group-Buying Sale—an on-line group-buying sale conducted using negotiating room tools and typically lasting for a shorter time duration than an on-line group-buying sale and with possibly fewer buyer participants. Any online group-buying sale may benefit from the communication and negotiating tools discussed herein, but a negotiating room on-line group-buying sale uses the speed and communications synergies provided by a negotiating room to effect an on-line group-buying sale rich in communications content. While on-line group-buying sales may include non-binding, revocable offers and buyer polling (e.g., voting), such activities are typically much more common in a negotiating room on-line group-buying sale. Negotiating room on-line group-buying sales may also include alterations of the initial featured item set; e.g., the sale may start with one item and later include a somewhat different although probably related set of featured items. While the negotiating room online group-buying sale may be conducted using a variety of formats, a seller/merchant/operator may use a negotiating room on-line group-buying sale as a tool for collecting highly accurate, up-to-date demand data from a potentially small but representative buyer group and then apply the demand data collected to one or more larger on-line group-buying sales being conducted concurrently and or in relatively close time proximity. While a negotiating room on-line group-buying sale could be conducted for any time period, a typical negotiating room on-line group-buying sale is conducted for a shorter time duration than an on-line group-buying sale (e.g., 1 hour versus 3 days.)

On-Line Group-Buying Mechanism—an apparatus configured to conduct an online group-buying sale. The on-line group-buying mechanism may be included in a Partner Site, an operator's Main Site, and a Seller site, for example, and/or have portions of its functionality split and/or shared between various sites. An on-line group-buying mechanism typically comprises a particular configuration of hardware and software needed to accomplish an on-line group-buying sale over an electronic network. Of course, an ordinarily skilled artisan will recognize that modifications may be made to the precise form of the on-line group-buying mechanisms described herein while still remaining within the scope of an on-line group-buying mechanism.

On-Line Group-Buying Sale—a method of selling products and services using an on-line group-buying mechanism. A PowerBuy™ group purchase represents a preferred on-line group-buying sale, although PowerBuys™ group purchases and their variants represent merely one type of on-line group-buying sale. An exemplary on-line group-buying sale is described more completely below.

Operator—the party owning or having a license to the right to operate an on-line group-buying mechanism and/or facilitating on-line group-buying mechanism displays on Partner sites. For example, the operator may be the operator of the invention described herein and the related inventions cross-referenced herein, or a licensee of such operator.

Operator's Main Site—a computer-operated location, such as a website, on which an on-line group-buying mechanism resides. For purposes of at least one embodiment of the invention, this site is an operator's site on which the PowerBuy™ method of sales is being practiced in accordance with the commonly assigned inventions referred to herein. An ordinarily skilled artisan will recognize that the on-line group-buying mechanism platform may provide a virtual presence only, with a substantial portion of the actual computing power driving the on-line group-buying mechanism sales method located elsewhere. In addition, embodiments of the invention are not limited to a single operator's main site. Embodiments of the invention are not limited to websites and/or communications using HTTP and may include computer-operated locations such as cable TV, digital interactive cable, etc.

Partner Site—any third-party owned or operated location, such as a website, within an electronic network, such as the Internet, that has been configured to display one or more on-line group-buying sales at their network location or website. The universe of partner sites potentially could encompass an entire electronic network such as the Internet and/or a channel(s) of a cable television network and/or wireless voice and data networks. However, it is expected that certain network locations or websites would be barred from participation for various reasons, e.g., inappropriate content. Of course, partner sites, seller sites, and/or an operator's site may be combined into one website.

PowerBuy™—a business method and its variants in which buyers wishing to purchase a particular product or service, or group of products and services, within a given time frame join forces in a buying group formed across an electronic network specifically to pursue or accomplish a desired purchase. The buying group potentially enables individual buyers to leverage their combined purchasing power to achieve an economic bargain superior to that attainable by any one buyer acting alone. A superior bargain for buyers may often be reflected in terms of a lower purchase price. For example, as more buyers join the buying group, the desired item's price typically declines. At the end of the purchase period, all successful buyers (i.e., those with offers at or above the final PowerBuy™ price) purchase the item at a final (low) price even if some buyers have submitted irrevocable offers specifying a price ceiling higher than the final (low) price. In some embodiments, the operator may complete the sales transaction with each buyer by accepting offers at or above the final price, charging each successful buyer's credit card at the time the purchased featured item is shipped to the buyer. In other embodiments, the operator may not complete purchase transactions directly with the buyers but may instead refer irrevocable and revocable purchase offers (or other expressions of interest in the featured item) to a partner or third-party seller who may then complete individual buyer transactions within the buying group by accepting any desirable irrevocable purchase offers and/or pursuing buyers' expressions of interest in a featured item.

Seller—a manufacturer, retailer, wholesaler, or other party offering at least one featured item for sale to consumers, businesses or other buyers via the on-line group-buying sale, such as a PowerBuy™. The operator and its partners may be sellers in some embodiments of the invention.

Voting Mechanism—Embodiments of the invention may use a voting mechanism to receive offers from buyers and to calculate a flash demand curve using the offers. Embodiments of the voting mechanism may also receive buyer responses in an on-line group-buying sale (e.g., a negotiating room on-line group-buying sale) in which the buyers have been asked to vote on some matter pertaining to a featured item, e.g.; "How many people would be willing to wait two weeks for delivery in exchange for a $20 reduction in price?" Embodiments of the voting mechanism may also assist an operator and/or seller representative establish consensus among a group of interested buyers and/or define relevant subgroups of buyers. Sample pricing votes (e.g., revocable offers) may also be taken using embodiments of the voting mechanism. The voting mechanism may tally both irrevocable votes and offers as well as non-binding votes and offers. Embodiments of the voting mechanism may be configured to provide results to operators, seller's representatives, and other interested parties, e.g., in some configurations, a seller may be allowed to view results for all sellers while in other configurations, a seller may be allowed to only view results for its own featured item. In any event, embodiments of the voting mechanism may be configured to collect both binding and non-binding responses from the buyers. Embodiments of the voting mechanism may present the results in the form of a graph, although other displays are possible. Embodiments of the voting mechanism may be produced in software, hardware, and in hybrid hardware/software systems. Of course, embodiments of the voting mechanism may be configured to calculate only the flash demand curve and/or only tally votes received from buyers.

SUMMARY DESCRIPTION

Embodiments of the invention also provide a method for communicating information between a first seller and buyers in a negotiating room associated with an online group-buying sale having a first featured item. The method comprises inviting the buyers to the negotiating room wherein the negotiating room provides support for communications about the on-line group-buying sale among the buyers and the first seller. The method may further include receiving an initial price for the featured item from the first seller and initiating the on-line group-buying sale for the first featured item after receiving the initial price from the first seller. Buyer communications may be transmitted to the first seller via the negotiating room wherein at least some of the communications contain offers for the featured item at various prices. The method may further include producing a first flash demand curve for the first featured item using the at least some of the communications that contain offers for the first featured item. The first flash demand curve may be provided to the first seller; and a modified price for the first featured item may be received from the first seller.

Embodiments of the invention provide a method for filtering communications between buyers and sellers in an on-line group-buying sale for a featured item. The method may comprise, for example, receiving filtering instructions for communications relating to the featured item in the on-line group-buying sale and setting a message receiver to process buyer communications in accordance with the filtering instructions. The method may further comprise receiving buyer communications pertaining to the featured item during the on-line group-buying sale and filtering the received buyer communications through the message receiver in accordance with the filtering instructions.

Embodiments of the invention also provide a method for allowing buyers and at least one seller to communicate about at least one featured item offered in an on-line group-buying sale. The method comprises receiving a buyer communication from a buyer of the buyers regarding the featured item and transmitting the buyer communication to a seller representative associated with the featured item. The seller representative may comprise a utility that permits the at least one seller to communicate to the buyer. The method further comprises receiving a response from the seller representative to the buyer communication; and transmitting the response to the buyer.

Embodiments of the invention also provide a method for determining a flash demand curve for a featured item offered by a seller in an on-line group-buying sale. The method comprises receiving an initial price for the featured item from the seller and initiating the on-line group-buying sale for the featured item after receiving the initial price from the seller. Offers for the featured item may be received from buyers wherein the received offers include prices equal to or less than the initial price. An instruction may be received to determine the flash demand curve after the initiation of the on-line group-buying sale. Embodiments of the method further comprise constructing the flash demand curve by plotting received offers on a graph according to price and quantity of offers received at each price; and transmitting the flash demand curve to the seller.

Embodiments of the invention also provide a method for allowing buyers and at least one seller to communicate about at least one featured item offered in an on-line group-buying sale. The method comprises receiving a buyer communication regarding the featured item and transmitting the buyer communication to a seller representative associated with the featured item. A portion of the buyer communication may be retained in a data repository wherein the data repository is configured to allow review of the communication portion by at least another buyer. A response may be received from the seller representative to the buyer communication. A portion of the seller representative's response may be in the data repository wherein the data repository is configured to allow review of the communication portion by at least another buyer. Instructions from the seller representative may be transmitted to an on-line group-buying mechanism hosting the on-line group-buying sale wherein the instructions alter a price of the featured item offered in the on-line group-buying sale.

Embodiments of the invention also provide a computer-implemented negotiating room system for communicating information between sellers and buyers associated with an on-line group-buying sale having a featured item. The negotiating room may include a message receiver and transmitter configured to receive buyer communications and send the buyer communications to the seller. A seller representative may be configured to assist the seller in reviewing and responding to buyer communications and further configured to send seller instructions to an on-line group-buying mechanism hosting the on-line group-buying sale. An outgoing message transmitter may be configured to receive communications from the seller and transmit the communications to the buyers.

Embodiments of the invention also provide a system for determining demand for a featured item offered in an on-line group-buying sale by at least one seller. An on-line group-buying mechanism may be configured to conduct the on-line group-buying sale for the featured item. A message receiver and transmitter may be configured to receive buyer communications wherein at least some of the buyer communications contain offers for the featured item. A voting mechanism may be configured to receive the offers from the message receiver and transmitter and calculate a flash demand curve using the offers. An operator representative may be configured to provide the flash demand curve to the at least one seller.

Embodiments of the invention also provide a system for selling featured items offered by a seller to buyers. A negotiating room may be configured to sell the featured items using an on-line group-buying sale wherein the negotiating room includes a voting mechanism configured to calculate at least one flash demand curve for the featured items using offers received from the buyers. An on-line group-buying mechanism may be configured to sell the featured items using a sale demand curve developed from the at least one flash demand curve.

Embodiments of the invention also provide a system for filtering communications during negotiations between buyers and a seller in an on-line group-buying sale for a featured item. A message receiver controller may be configured to receive instructions from the seller wherein the instructions pertain to setting a message receiver and transmitter to process buyer communications. A message receiver and transmitter may be configured to receive buyer communications pertaining to the featured item during the on-line group-buying sale. A seller representative may be configured assist the seller in process received buyer communications.

Embodiments of the invention further provide a data processing system that provides communications between buyers and a seller during an on-line group-buying sale for a featured item. The data processing system includes negotiating room software executable on the data processing system and is configured to transmit communications from the buyers to the seller wherein at least some of the communications contain offers for the featured item. The data processing system is further configured to produce a flash demand curve for the featured item using the offers for the featured item and also configured to provide the flash demand curve to the seller.

Embodiments of the invention also provide a data processing system that determines demand for a featured item during an on-line group-buying sale. The data processing system includes negotiating room software executable on the data processing system and is configured to initiate a first on-line group-buying sale wherein the first online group-buying sale is conducted in association with buyers and a seller. The data processing system is further configured to produce at least one flash demand curve for the featured item using offers received from the buyers of the first on-line group-buying sale. The data processing is configured to provide the flash demand curve to the seller wherein the seller uses the at least one flash demand curve to create a sale demand curve for the featured item. The data processing system is also configured to initiate a second on-line group-buying sale of the featured item using the sale demand curve.

Embodiments of the invention also provide a computer-readable data transmission medium containing a data structure. The data structure comprises a first portion that specifies a featured item in an on-line group-buying sale, a second portion that specifies a communication about the featured item, a third portion that identifies a buyer who prepared the communication, a fourth portion that identifies a seller to receive the communication, and a fifth portion that specifies a buyer-requested communications format for the communication.

Embodiments of the invention also provide a computer-readable medium having computer-executable instructions for performing a process for allowing buyers and at least one seller to communicate about a featured item offered in an on-line group-buying mechanism. The computer-readable medium comprises instructions for receiving a buyer communication from a buyer of the buyers regarding the featured item and for transmitting the buyer communication to a seller representative associated with the featured item wherein the seller representative comprises a utility that permits the at least one seller to communicate to the buyer. The computer-readable medium further comprises receiving a response from the seller representative to the buyer communication; and transmitting the response to the buyer.

BRIEF DESCRIPTION OF THE DRAWINGS

An embodiment of the invention will be described below relative to the following figures. Note that similar elements and steps in the figures have the same reference number.

FIG. 6A illustrates a sample message receiver and transmitter 501, according to an embodiment of the invention.

FIG. 17 is a more detailed block diagram of a portion of the software components in FIG. 16 for implementing an embodiment of the invention.

DETAILED DESCRIPTION OF THE INVENTION

Figure 1:
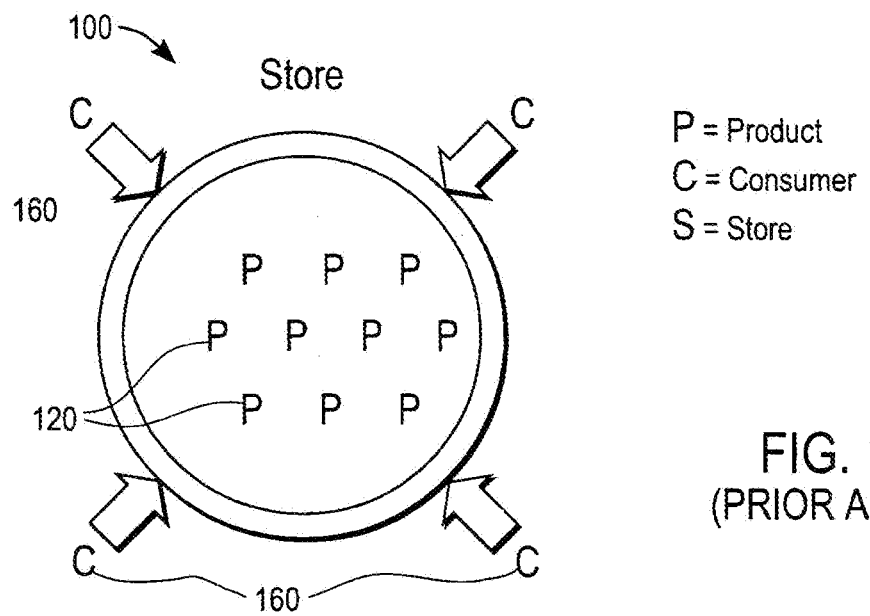
FIGS. 1 and 2 are simplified diagrammatic representations of prior art sales models that may be useful for understanding the invention.
Figure 2:
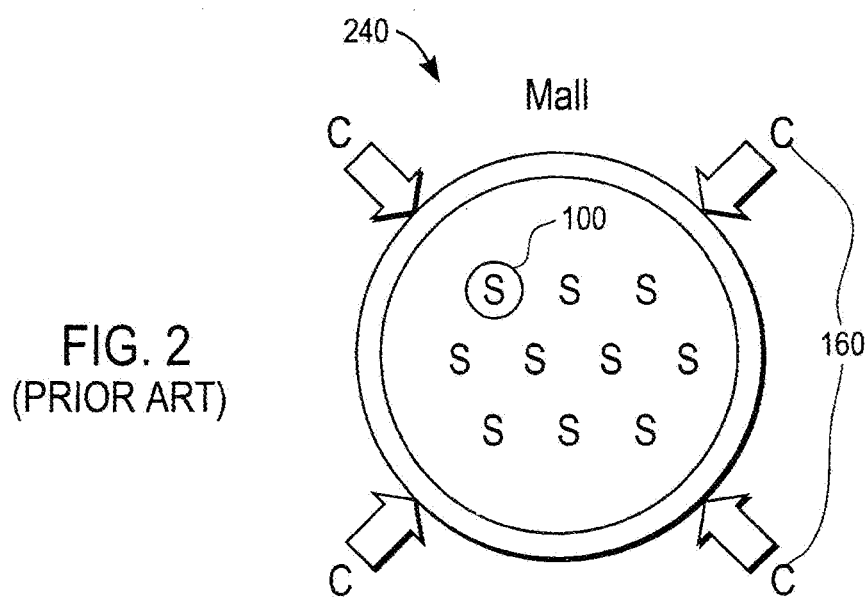
Figure 3:
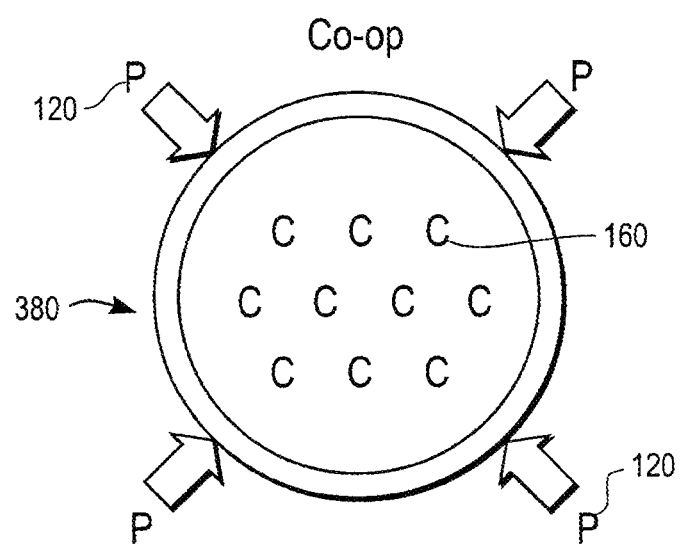
FIG. 3 is a corresponding simplified diagrammatic representation of an on-line group-buying sale in accordance with an embodiment of the invention.

Introductory Description of an On-Line Group-Buying Mechanism

Embodiments of the invention described herein may operate in conjunction with an on-line group-buying mechanism to provide buyers and sellers with an improved method and system for communicating about featured items offered in an on-line group-buying sale and for negotiating improved prices for the featured items from sellers. Online group-buying mechanisms are described in the following related pending, commonly owned applications:

"Demand Aggregation Through Online Buying Groups," U.S. application Ser. No. 09/270,219, filed Mar. 15, 1999 in the names of Tom Van Horn, Niklas Gustafsson and Dale Woodford, the disclosure of which is incorporated herein by this reference;

"Dynamic Market Equilibrium Management System, Process and Article of Manufacture," U.S. application Ser. No. 09/281,859, filed on Mar. 31, 1999 in the names of Richard V. Halbert, Niklas Gustafsson and John M. Thrun, the disclosure of which is incorporated herein by this reference, and "System and Method for Extension of Group-Buying Throughout the Internet," U.S. application Ser. No. 09/409,237, filed on Sep. 30, 1999 in the names of Tom Van Horn, Jon C. Engman, Richard V. Halbert, Niklas Gustafsson, Dale Woodford, Jerome P. Pache, and Greg C. Dean, the disclosure of which is incorporated herein by this reference.

The following provides a more detailed description of a PowerBuy™, which represents a preferred on-line group-buying sale. The description of this specific form of on-line group-buying sale provides an understanding of the on-line group-buying mechanisms with which embodiments of the invention have been developed to interact. Of course, there are other forms of on-line group-buying sales. A featured item (e.g., a product or service) to be offered for sale in a PowerBuy™ may be defined by placing onto an e-commerce server a set of data describing the on-line group-buying sale in terms of its price curve(s), the featured item, the time interval during which the on-line group-buying sale is available, and any minimum and maximum quantities available. Some of these defining properties of an on-line group-buying sale may not necessarily be revealed to the buyer.

When the on-line group-buying mechanism that hosts the PowerBuy™ becomes available, buyers enter their offers into the on-line group-buying mechanism, indicating a maximum price at which they will commit to purchase the featured item. This may be at the current price, or it may be below the current price in a typical embodiment. Once the current price is justified by the volume of on-line group-buying sale offers, all offers within a specified reasonable range below the current price will trigger a new, lower current price for the featured item, according to the PowerBuy™, the preferred on-line group-buying sale.

In general, offers at the current price guarantee availability of the amount of the featured item, such as a product or product variant, specified in the offer, provided that the amount does not exceed the difference between the current number of similarly committed units and any maximum number of units available. Note that the starting price may be established when the on-line group-buying sale is announced, before any offers have been submitted based on the price curve and/or other featured item data. Such starting prices may be based on a minimum number of units that should be ordered for the on-line group-buying sale to qualify for that price.

In many on-line group-buying mechanisms, including a PowerBuy™, a contingency may be placed on a buyer's offer based on price. Specifically, when any given buyer indicates that he does not find the current price acceptable, but nevertheless wishes to buy the featured item at a lower price, his offer may be made contingent upon the on-line group-buying sale reaching the lower price. However, should his offer be deemed to fall within reasonable range of the current price, as defined separately for each on-line group-buying sale, it may be considered part of the market dynamics around the featured item offered in the on-line group-buying sale. As such, the offer may reduce the price of the on-line group-buying sale. As more offers are made, and the current price drops to a level at or below the contingent price specified, the contingency based on price is removed. Offers may be increased up to the current price any time during the on-line group-buying sale, such as when buyers wish to improve their chance of success or ensure availability of the item. However, offers may not typically be cancelled nor may buyers typically reduce their offered price.

Regardless of the maximum price specified within each purchase offer, all members of the on-line group-buying sale typically receive the benefit of the lowest final price, including PowerBuy™, the preferred on-line group-buying sale. In addition to seeing the current price go down, the buyers may also be given an indication of how many more participants it may take to get the price down to a specified amount, in some embodiments. Other embodiments may require a critical mass of accepted offers in order for the sale to proceed, and in such embodiments, the buyers may also be given an indication of how many more participants it may take to attain the critical mass. While every offer might affect the price by small decrements, the price reductions that are sufficiently compelling to encourage buyers to refer others to the on-line group-buying sale might be much greater and may vary from on-line group-buying sale to on-line group-buying sale. Therefore, in some embodiments, an on-line group-buying sale may be further defined by a "price curve visibility window," which is the difference in price that is deemed interesting to a buyer of a given merchandise. The visibility window is in essence the granularity at which the actual price curve is displayed to buyers.

Merchandising and yield management personnel of an operator, partner or seller may define each on-line group-buying sale by means of data entry. Such data entry is not typically limited to the time period prior to the opening of an on-line group-buying sale, nor is the transaction necessarily completed at the time the conclusion of the on-line group-buying sale's duration. The definition of an on-line group-buying sale, including its price curve, may be subject to modification at any time during its lifetime or thereafter. In fact, the ability to modify the on-line group-buying sale definition based on data gathered from offers to participate in an on-line group-buying sale is a somewhat unique characteristic of PowerBuy™, one embodiment of an on-line group-buying sale.

Buyers may be permitted to initiate electronic communications, such as e-mail messages, web-based forum postings, and chat-room postings, designed to increase buyer volume, thereby further reducing the price available to all. The recipient of such an electronic communication may be directed back to the specific on-line group-buying sale by either a reply function or a link within the electronic communication. The recipient, likewise, can then send messages to his or her friends and so on.

The on-line group-buying mechanism can be used to notify buyers and/or sellers of pending or recent events of interest to the buyer. These events may include, but are not limited to, changes in the current price for the featured item, pending closure of the on-line group-buying sale at a price that is above the buyer's offer (and therefore the buyer needs to raise his or her offer, if purchase of the featured item is still desired), new offers made by other buyers (with due attention to protecting the privacy of the other buyers), and other on-line group-buying sales formed for selling similar featured items.

In some embodiments, when an on-line group-buying sale is closed, either because the prescribed time limit is met, or any maximum number of available items is satisfied by the demand presented by the buying group, all offers at or above the closing price are typically accepted and final sales information is communicated to other server processes, which handle the orders' fulfillment via traditional means of hard and digital goods transportation. Buyers who made successful offers are notified of acceptance and merchandise shipment, and those buyers whose offers were not successful are typically notified of the result. In some embodiments, the close of an on-line group-buying sale may result in a referral by the operator of buyer and offer data to a non-operator seller or partner who then can take appropriate action in pursuing the close of each desirable sales transaction within the buyer group. In these instances, follow-up interaction with those making successful and unsuccessful offers is typically conducted by the non-operator partner or seller.

In addition to participating in on-line group-buying sales, buyers may utilize an input feature to suggest featured items or product/service categories for which they have an interest in an on-line group-buying sale being created. Further information may be gathered regarding the prospective buyer's preferences including acceptable prices, and such prospective buyer may then be notified at the time his or her items are sold in an online group-buying sale. Other aspects of this function may include a focal point or community for buyers to suggest and organize a wide variety of on-line group-buying sales designed to suit their every need, including the ability to create a market for desired products or services by assembling sufficient demand to support a desired purchase. A given buyer may also participate in achieving sufficient demand around the specific manufacture of particular merchandise suggested by the various buyers, or the creation of broader interest groups around a merchandise category, e.g., a product/service category.

An ordinarily skilled artisan should recognize that the foregoing discussion and the related applications incorporated by reference describe various possible on-line group-buying mechanisms and are particularly focused on PowerBuy™. Of course, an ordinarily skilled artisan should also recognize that additional on-line group-buying sale formats and on-line group-buying mechanisms are possible, although all such envisioned on-line group-buying mechanisms shall feature demand aggregation of various buyers as a technique for reducing the price of the offered goods and services.

Description of a Sample Negotiating Room Architecture

Embodiments of the invention may provide increased communications between buyers and sellers beyond simple communication of prices and offers for featured items. Accordingly, such embodiments of the invention may enhance a sense of community sometimes associated with a group-buying experience. Sellers and buyers may even discuss advantages and disadvantages of the featured times and use such discussions to arrive at a different price for the featured item. Embodiments of the invention may also decrease the amount of time in which an on-line group-buying sale is conducted, e.g., an hour for a negotiating room on-line group-buying sale versus several days for a non-negotiated group-buying sale. Both sellers and buyers may contribute to the negotiations and such contributions may by followed by immediate reactions, followed by many additional iterations, according to an embodiment of the invention. The negotiating room buying participants may react immediately to a seller's actions by virtue of their presence during live negotiations and/or through the use of automated instant messaging technology programmed to alert the buyers of changes in price or merchandise features, which may be especially helpful when only a limited time exists between when buyers must respond with their final offers to seller communications and when the seller's end price becomes known, according to an embodiment of the invention. In addition, message threads of communications between buyers and sellers may be retained so that buyers (e.g., buyers who did not participate in the negotiating room on-line group-buying sale) may review what happened during the negotiating room on-line group-buying sale. For example, in an embodiment of the invention having a threaded message capability, the message threads may be available to buyers for some period of time during and after the sale (e.g., a week). In an embodiment of the invention having a cable television capability, the negotiations or some portion of the negotiations (e.g., highlights) could be available via a capability such as streaming media clips during and after the sale (e.g., a week).

As previously discussed, an on-line group-buying mechanism may benefit from additional methods and systems for encouraging buyers and sellers to participate in the on-line group-buying mechanism and for facilitating communications between buyers and between sellers. While various metaphors may be utilized in the design of a system for facilitating such buyer-to-buyer and seller-to-buyer communications, the negotiating room metaphor may be the most appropriate. Accordingly, the following discussion envisions a method and system for further aggregating demand among buyers and for supporting sales of one or more featured items by an on-line group-buying mechanism by providing buyers and sellers with various communication and negotiating tools.

Figure 4:
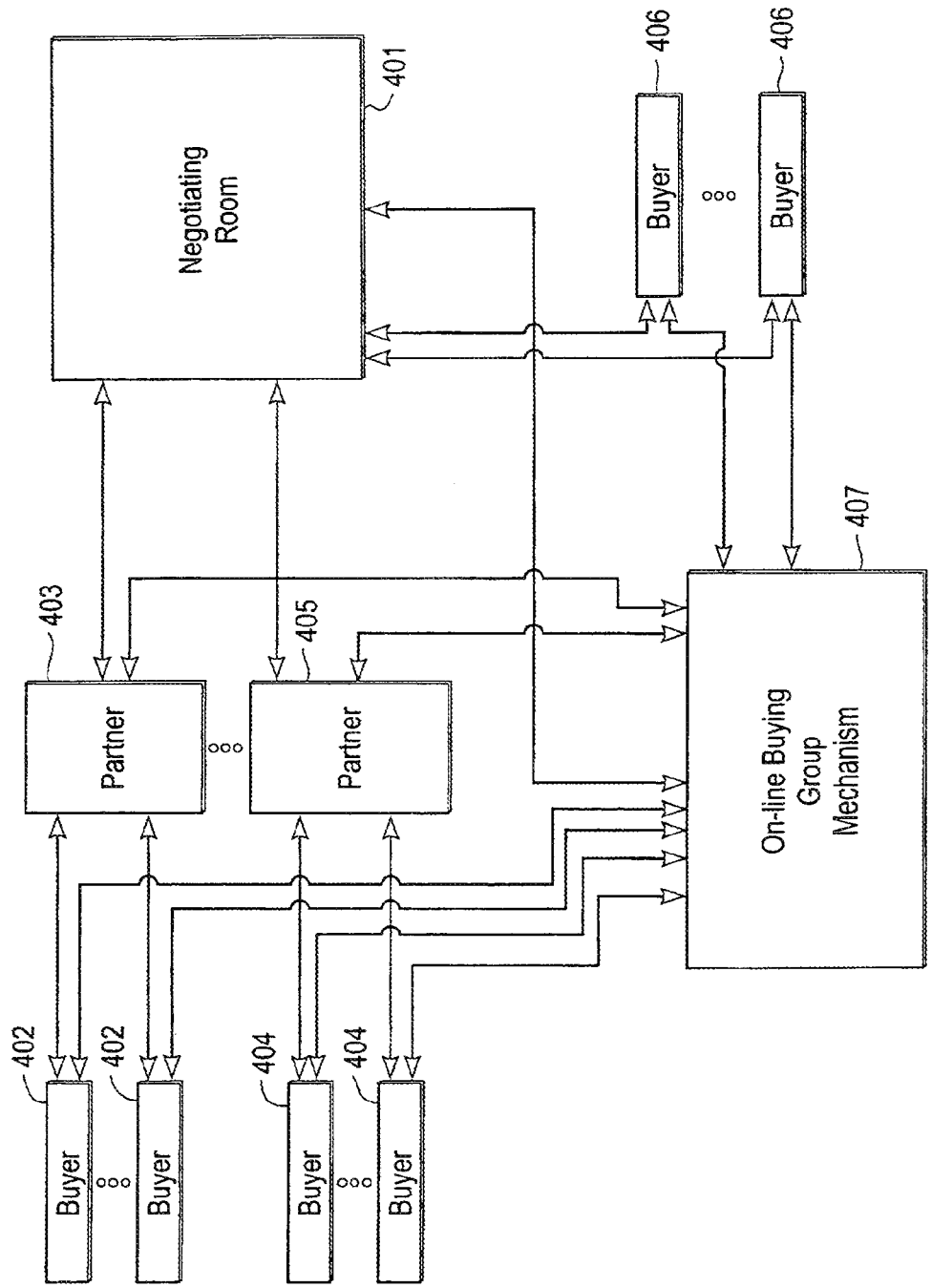
FIG. 4 illustrates a sample negotiating room architecture, according to an embodiment of the invention.

FIG. 4 illustrates a sample negotiating room 401 architecture, according to an embodiment of the invention. The negotiating room 401 is associated with, and configured for communications with, an on-line group-buying mechanism 407. The negotiating room 401 typically represents a computing system, e.g., a computing system operated on behalf of a seller and/or an operator. The on-line group-buying mechanism 407 typically represents a computing system, e.g., a computing system operated by a merchant and/or operator who facilitates the sale of a featured item(s) on behalf of itself and/or a third party merchant in an on-line group-buying sale. The operator of the negotiating room 401 may be a demand aggregation service provider associated with the featured item, according to an embodiment of the invention. The negotiating room 401 may alternatively be operated by a seller or manufacturer of the featured item, according to an embodiment of the invention. Alternatively, the negotiating room 401 may be operated by an on-line retailer of consumer or business products (e.g., the party associated with the on-line group-buying mechanism 407) or another partner, according to another embodiment of the invention.

The negotiating room 401 is associated with, and configured for communications with, partners 403 and 405, as is the on-line group-buying mechanism 407. Buyers 402 are associated with the partner 403; buyers 404 are associated with the partner 405, while buyers 406 have no associated partner and may directly contact the on-line group-buying mechanism 407. The buyers 402, 404, 406 may communicate with each other directly, via the partners 403, 405, via the on-line group-buying mechanism 407, the negotiating room 401 and/or via an electronic network between them (e.g., an Internet connection), according to embodiments of the invention. An ordinarily skilled artisan will recognize that various communications mechanisms may be used to provide buyer-to-buyer communications, including but not limited to electronic mail or instant messaging. The buyers 402, 404, 406 typically represent devices configured for communicating information from buyers across an electronic network, e.g., computers, telephones, etc. Likewise, the partners 403, 405 also typically represent devices (e.g., computing systems) configured for communications across electronic networks.

In the typical negotiating room scenario, the buyers 402, 404, 406 communicate with the negotiating room 401 concerning particular featured item(s) offered for sale through the on-line group-buying mechanism 407. The buyers' communications may concern the price of the featured item(s), questions about the featured item(s), questions about servicing the featured item(s), comparisons of competing products, or more general matters, such as the buyers' general likes and dislikes, especially with regard to the seller's featured item(s). In return, seller may use the negotiating room 401 in answering the buyers' questions and may, in some instances, use the buyers' questions as motivation for lowering the price of the featured item(s), sua sponte, in the on-line group-buying mechanism 407. For example, the seller associated with the negotiating room 401 may discover early on while conducting an on-line group-buying sale that its understanding of the buyers' actual pricing/demand curves for a featured item was completely mistaken. The seller's impressions may be further confirmed by the communications received in the negotiating room 401 from the buyers. Accordingly, the seller may instruct that different data be used in the on-line group-buying mechanism 407, i.e., a steeper price curve may be used instead of the original price curve. Such behavior by the seller may result in a more successful on-line group-buying sale than would have otherwise resulted using the on-line group-buying sale's original parameters. Likewise, the seller may create market goodwill for its merchandise by its responses to buyer questions. The seller may even offer particular buyers rebates for use in the on-line group-buying sale for various reasons, e.g., as a response to a buyer's description of shortcomings with earlier models of the merchandise.

Eventually, the buyers 402, 404, and 406 may communicate to the on-line group-buying mechanism 407 their offers with regard to the featured item (e.g., merchandise) being offered in the on-line group-buying sale. The on-line group-buying mechanism 407 conducts on-line group-buying sales in the manner previously described, although the seller may be permitted to intervene directly in some instances in the sale. In some embodiments of the invention, the on-line group-buying mechanism 407 may provide access to the buyers' offers to functionality associated with the negotiating room 401. In addition, in some embodiments, the buyers' offers may arrive at the negotiating room 401 and be passed on to the on-line group-buying mechanism 407.

The buyers 402, 404 communicate with the negotiating room 401 through their respective partner 403, 405, while the buyers 406 communicate directly with the negotiating room 401. As intermediaries, the partners 403, 405 may pre-process some communications passing between the buyers 402, 404 and the negotiating room 401, although they are not required to do so. For example, the partners 403, 405 may collect additional data related to a particular on-line group-buying sale that they make available only to their respective buyers 402, 404, e.g., a partner-to-buyer service called "our edge." The partners 403, 405 in cooperation with either the negotiating room 401, the on-line group-buying mechanism 407, or on their own initiative may offer a discount program or rebate associated with a particular merchandise offered for sale. In an embodiment of the invention, negotiating room functionality in conjunction with an online group-buying sale may be offered exclusively to a particular partner's 403 buyers 402 as a special service provided by that partner 403 solely to its buyers 402. This embodiment may be used to permit similarly situated buyers (perhaps all belonging to a particular affinity group sponsoring the partner website (e.g., a union or a buying club)) to create a market for specialized merchandise or private-label merchandise customized to the group and bearing the private label of the sponsor of that partner website (e.g., a Seahawks branded sports utility vehicle of a particular make and model specially manufactured and co-branded for this group by Toyota).

The negotiating room 401 and/or the seller's site may be incorporated within the on-line group-buying mechanism 407, vice versa, or the negotiating room 401 may be separated from the on-line group-buying mechanism 407 (as shown). Of course, the seller's site (and/or the negotiating room 401) may be incorporated within one or more of the partners 403 and 405, vice versa, or the negotiating room 401 may be separated from the partners 403 and 405 (as shown). The system is likewise operable with more or fewer partners and more or fewer buyers.

Communication lines, such as those associated with an electronic network, have been drawn between the buyers 402, 404, 406, the partners 403, 405, the negotiating room 401, and the on-line group-buying mechanism 407 for convenience of explanation. As one of ordinary skill in the art will recognize, the system could operate with fewer and/or more direct communications between various entities. The electronic network represented by the communication lines between the buyers 402, 404, 406, the negotiating room 401, the partners 403, 405, and the on-line group-buying mechanism 407 may be comprised of a variety of electronic communication media. For example, the negotiating room 401 may communicate to the buyers 402 via a cable television communication that passes through the partner 403, which may be a cable television network and/or station, before arriving at buyer televisions 402. The negotiating room 401 may also communicate via a telephone transmission, conducted through the partner 405, to telephones (e.g., portable cellular telephones) of the buyers 404. In addition, the negotiating room 401 may communicate with the buyers 406 over the Internet. Of course, the on-line group-buying mechanism 407 may have similar electronic communications media established for communications with the buyers 402, 404, 406, the partners 403, 405, and the negotiating room 401. Likewise, the buyers 402, 404, 406 and the partners 403, 405 may use the same, or other communication media to communicate with each other and with the negotiating room 401 and the on-line group-buying mechanism 407. In some embodiments, the negotiating room 401 may route some, or all, of its communications through either the partners 403, 405 and/or the online group-buying mechanism 407.

Of course, as an ordinarily skilled artisan will recognize, if a communication recipient (e.g., the negotiating room 401 and the on-line group-buying mechanism 407) can receive communications in a variety of electronic media, then the recipient may need to aggregate the communications together. For example, if the on-line group-buying mechanism 407 receives incoming communications from buyers over the PSTN, the Internet, and other electronic networks all for the same on-line group-buying sale, then the on-line group-buying mechanism 407 may need to identify the portion of the communication pertaining to the substance of the on-line group-buying sale, however transmitted, and place it with the collection of other communications for the same on-line group-buying sale, however transmitted, in order to determine the present state of the online group-buying sale, e.g., 200 offers from the telephone and 500 offers from the Internet combines to 700 offers.

As one of ordinary skill in the art will recognize, the buyers 402, 404, and 406 may require some form of customized client-side software. For example, HTML pages may not typically provide the type of user interface required for a successful negotiating room viewer, and HTML may not be successful at producing incremental changes to message lists for messages between buyers and sellers. An ordinarily skilled artisan will recognize that the customized software could be provided to the buyers 402, 404, and 406 in forms such as applets, plugins, and stand-alone applications. The particular form selected may depend upon a variety of considerations, each of which could vary depending upon a number of factors, such as the computing environment believed to be used by the buyers, or at least the average buyer. For example, while Java applets, may be easy to produce, the typical client browser may require that a suitable Java environment already be installed. Netscape browsers, for example, may satisfy such requirements but Internet Explorer browsers may not always have the latest version of the Java virtual machine. Of course, support could be limited to the use of the Java subset supported by Internet Explorer, but this approach may not produce optimal results in some embodiments. A browser plugin could be used in some embodiments, although this approach may present difficulties in some environments. For one thing, it may be helpful to develop plugins for the popular browsers on the popular platforms. More specifically, plugins may be helpful for Netscape and Internet Explorer in Windows systems and probably on Macintosh computers as well. Of course, Unix variants might also be applicable in some embodiments as well. In addition, a Macintosh OS-specific standalone application could also be prepared. A Java-based program could be developed for most platforms, as well as a pure Win32 program for Windows. Selection and development of any of the approaches described above is well within the abilities of an ordinarily skilled artisan.

Thus, a stand-alone application, written in a language such as Java, that can run virtually unmodified on all platforms, represents the preferred approach since it may be the easiest approach to implement. In this embodiment, the buyers 402, 404, and 406 would merely need to download and install the appropriate software prior to participating in a negotiating room session. Of course, such software could be provided in response to a buyer's attempt to access the negotiating room functionality. As an ordinarily skilled artisan will recognize, an appropriate installation program includes functionality for installing the appropriate software on a new machine. For example, a number of Java-cognizant installation programs already know how to install a Java virtual machine on the buyer's platform if such software was not already installed. In an alternative embodiment, a diagnostic program could analyze a buyer's computing platform (e.g., computer, cell phone, etc.) when the buyer attempts to access negotiating room functionality and select the appropriate client-side software for the buyer's computing platform and then supply the appropriate software to the buyer's computing platform.

Figure 5:
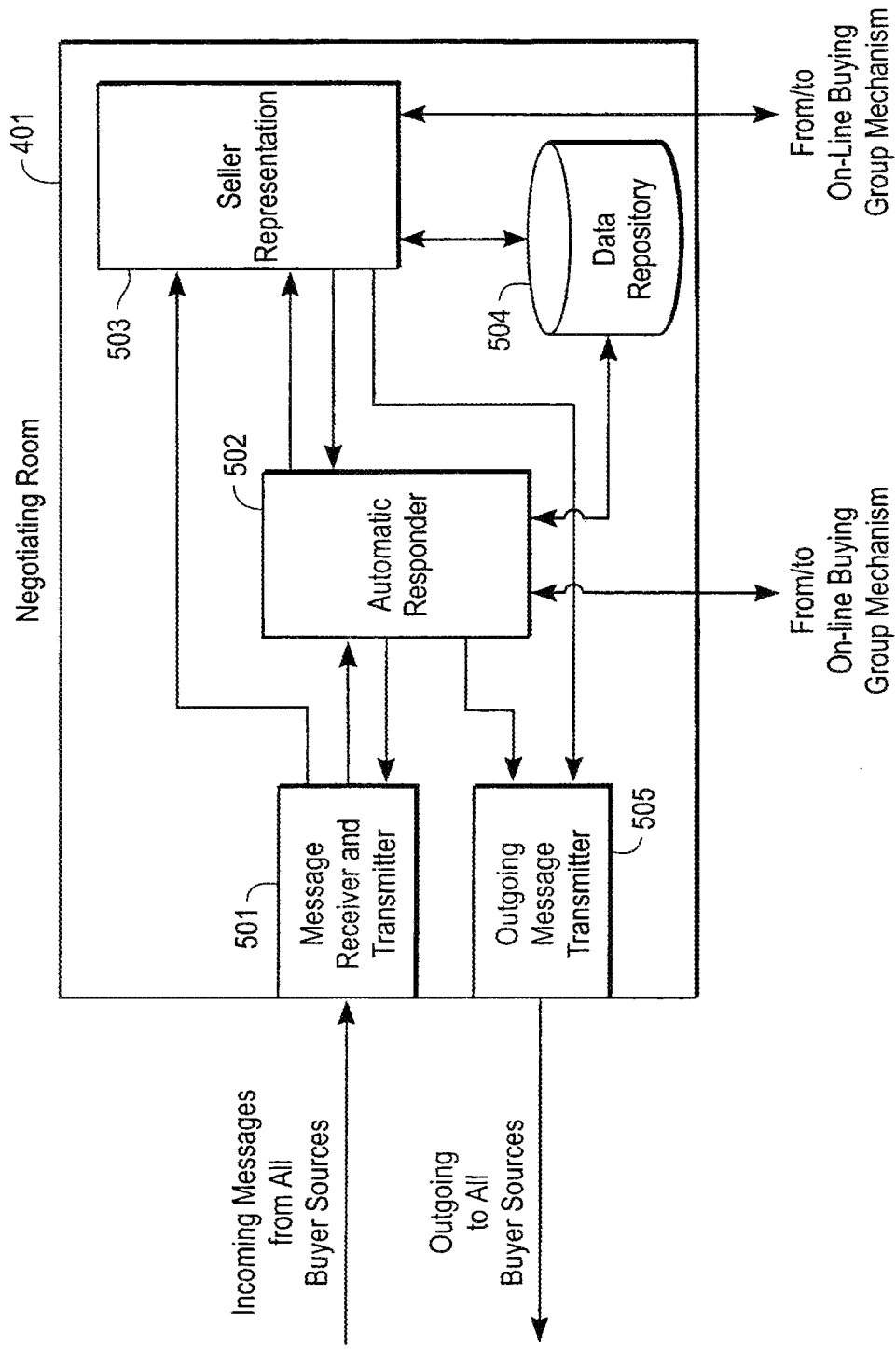
FIG. 5 illustrates a sample seller's architecture for a seller, according to an embodiment of the invention.

FIG. 5 illustrates a sample architecture for use by the negotiating room 401, according to an embodiment of the invention. Communication (e.g., text communications) among a large number of persons (e.g., the buyers 402, 404, 406) creates a great deal of messages, including "noise," which preferably should be filtered and managed to enable the negotiating room operator and/or merchandise seller 401 to respond in an appropriate manner so as to allow the seller to take advantage of information received from buyers and/or other sellers. For example, in a large on-line group-buying sale without message filtering, the seller may become overwhelmed with buyer messages, rendering the seller unable to appropriately and/or to timely respond to the buyer messages received. Accordingly, a message receiver and transmitter 501 receives incoming messages and performs various filtering and routing tasks. Of course, since some communications may comprise prices at which buyers and sellers are willing to contract to purchase featured items (e.g., in the manner described in the commonly assigned applications referenced above), filtering of such messages may be unnecessary and/or such messages may be automatically processed (e.g., using the methods and systems described in the commonly assigned applications referenced above).

In a preferred embodiment, polling technology may be used initially to establish consensus among the buying group regarding desired product features and/or the formation of any commercially viable subgroups of buyers. Offer-based communications may then be used as much as possible thereafter to allow the negotiating process to be relatively streamlined and easily managed through the use of the methods and systems described in the commonly assigned applications incorporated by reference hereinabove regarding the handling and management of purchase offers and may potentially achieve or maximize a given seller's various business objectives in response to demand and price point preferences expressed by the group on the same or similar featured items at varying price points. Of course, such offer-based communications in both revocable or irrevocable formats when solicited in response to particular seller questions (e.g., "Please enter your offer now if you'd prefer the purple baby jogger") may nevertheless stimulate, a much broader "discussion" among buyers and sellers than is enjoyed by typical embodiments of on-line buying-group mechanisms due to the presence of the communications capabilities disclosed herein.

An automated responder 502 receives incoming messages (typically after they have passed through the message receiver and transmitter 501). The automated responder 502 may include various components configured to prepare and send automated responses to the buyers. The automated responder may also include components for transmitting received messages to sellers, e.g., transmitting messages according to a requested format. In some embodiments, the automated responder 502 may contain special software that pre-processes incoming and/or outgoing messages to simplify the tasks that need to be performed by human operators. In other embodiments, the automated responder 502 may have special software configured to examine incoming messages, prepare detailed responses for some messages, while sending some other messages on to human representatives (e.g., seller representatives). In some embodiments, the automated responder 502 may have software configured to use buyer input to form sub-groups of buyers, with or without offering sub-chat capabilities, as a way of streamlining the purchase flow process and the remaining buyer/seller communications. Of course, the automated responder 502 may have limited application to some communication formats/treatments (e.g., auditorium chat) and may be disengaged from processing inappropriate messages, according to an embodiment of the invention.

A seller representative 503 or forum moderator receives many of the incoming messages, examines them, and prepares an appropriate response and/or routes messages to customer service agents of the seller or operator assigned to work with the particular negotiating room and respond to messages of any or all types. The seller representative 503 includes the equipment and tools (e.g., software) needed by the seller representative (either human or autonomous/semi-autonomous system) to read and respond to incoming messages. As previously discussed, the seller may communicate information about an ongoing (or forthcoming) on-line group-buying sales to the on-line group-buying mechanism 407. This task is typically performed by the seller representative 503 but may in some instances also be performed by the automated responder 502 or customer service agents of the seller or operator. Some messages prepared by the seller representative 503, customer service agents, and/or the automated responder 502 may be stored in a persistent storage mechanism, such as a data repository 504. For example, the negotiating room 401 may receive many similar and/or related messages that can be answered with the same/similar response. In addition, the negotiating room 401 may be operated in an autonomous/semi-autonomous mode (e.g., such as during after hours) in which the seller representative 503 is not actively processing messages, but such messages may be automatically responded to by the automated responder 502. An outgoing message transmitter 505 completes the process of sending messages back to buyers. The outgoing message transmitter 505 may place outgoing messages in an appropriate format for receipt by the buyer who sent the message being answered. Of course, the buyers may include various partners acting as surrogates and/or intermediaries for particular sets of buyers. In some embodiments, the seller representative 503 comprises human operators having appropriate computer/communications equipment while in other embodiments, some form of automated and/or semi-autonomous system may be used.

FIG. 6A illustrates a sample message receiver and transmitter 501, according to an embodiment of the invention. The message receiver and transmitter 501 may provide various message treatments for incoming buyer communications, such as a chat enabler 601, an auditorium chat enabler 602, a threaded message/newsgroup enabler 603, and a message board enabler 604. As previously discussed, the volume of incoming messages, including "noise," may become a serious problem with any system in which a small number of persons/responders are expected to receive and process a large volume of incoming messages (e.g., messages that comprise content other than an offer price). Accordingly, operators may also encourage feedback from buyers in the form of irrevocable offers or revocable offers to purchase the featured items or alternative featured items, especially since such offer information can typically be analyzed and responded to with relative ease (e.g., automatically and/or by utilizing the methods and systems disclosed in the commonly assigned applications referenced above).

The chat enabler 601, when activated, passes incoming messages on to the next stage of processing, which may be pre-screened by a moderator or customer service personnel, and engages conventional chat functionality. The chat enabler 601 is typically active when the volume of incoming messages is below a particular level. The chat enabler 601 may be automatically disengaged when the volume of incoming messages reaches a certain level, for example. Of course, some sellers may simply choose to always (or frequently) have the chat enabler 601 disengaged. By contrast, other sellers may choose to have the chat enabler 601 enable chat communications at a relatively low level as a means of keeping directly in touch with the buyers. For example, the seller associated with the negotiating room 401 might choose to set the chat enabler 601 to enable chat-type communications with 5 percent of incoming buyer messages while providing different processing/treatment for the other incoming messages.

The auditorium chat enabler 602, when activated, passes incoming messages on to the next stage of processing and enables an auditorium chat functionality in which a limited number of buyers may, at any one instance, communicate with the seller, often through a moderator who conducts pre-screening of buyer questions, to facilitate an appropriate dialog with seller representatives. In a typical auditorium chat format, only a few participants (e.g., an operator, a merchant, a seller and/or a selected buyer(s)) may provide comments directly to the audience while other participants (e.g., potential buyers) may have more limited participation (e.g., buyers submit their comments to the operator who reviews them for appropriateness before providing them to the seller or other buyers for a review and response). The auditorium chat enabler 602 may also be configured for a conventional stage room communications format in addition to, or in place of, a conventional auditorium chat format. A stage format typically asks participants (e.g., buyers) to "stand in line" before making comments available to the audience. The preferred auditorium chat enabler 602 provides structure to the communications between buyers and sellers beyond first-come, first-heard, and preferably has some form of moderator or moderation of the communication. The message receiver and transmitter 501 and/or the auditorium chat enabler 602 may be constructed using at least some existing components, e.g., iChat technology for text chat messaging, and/or existing video and voice chat technology designed to handle large groups of participants. In some embodiments, some buyers' communications might receive pre-composed message responses while other buyers may be placed in a queue for posing questions to a moderator and/or a seller representative. In some embodiments, the moderator may select representative and appropriate questions and pose them to the seller and/or seller's representative, and the moderator may then provide the seller's response for the benefit of the entire buying group. In addition, in some embodiments, the message receiver and transmitter 501 may even place some users in a sub-chat group of people having similar comments/inquiries (e.g., in order to streamline certain discussions not believed to be of interest to the broader group.)

The auditorium chat enabler 602 may otherwise be operated in a manner similar to that described above for the chat enabler 601. In addition, just as an operator may choose to have some percentage of incoming messages receive chat treatment, an operator may likewise choose to have some percentage of incoming buyer messages receive an auditorium chat treatment while providing other treatments for remaining messages. Of course, a seller could also choose to have some percentage of incoming messages receive one treatment, another percentage receive still another treatment, and yet another percentage of incoming messages receive yet another treatment, etc.

The threaded message/newsgroups enabler 603 also provides a method of communicating with buyers. The enabler 603, when activated, passes incoming messages on to the next stage of processing and enables conventional threaded message/newsgroup functionality. The advantage of the newsgroup model is that the entire conversation is typically stored and can be examined at any time. Also, replies to a given topic are "threaded" together so that they can be followed independently of the other discussions going on concurrently on different topics. For example, a negotiating session may last an arbitrarily long time (e.g., several hours or several days), if desired, and people, including the seller's representative 503, might wish to show up, read some threads, post comments, and then leave the negotiating room 401. Allowing all the buyers to show up when they want is sometimes more effective in terms of increased participation than requiring everyone to be present for the duration of the on-line group-buying sale for a particular featured item. Threading messages allows the seller to organize messages so that buyers can follow topics that they are interested in and ignore topics that they don't care about. The seller representative 503 is in the same situation and can use the same solution, e.g., closely follow threads that are relevant and ignore threads that are off-topic. As described above, a seller may likewise choose to have some percentage of incoming buyer messages receive threaded message/newsgroup treatment while providing other treatments for the remaining messages.

The message board enabler 604 resembles the threaded message enabler 603 but typically provides less sophisticated message organization. The message board enabler 604 may otherwise be operated in a manner similar to that described above for the threaded message enabler 603. In addition, just as a seller may choose to have some percentage of incoming messages receive chat treatment, a seller may likewise choose to have some percentage of incoming buyer messages receive message board treatment while providing other treatments for remaining messages.

The message receiver and transmitter 501 may alternatively allow buyers to select a treatment for their message. For example, the seller could set the message receiver and transmitter 501 so that some treatments were never available while other treatments were available depending upon demand and/or request. Of the set of treatments not curtailed by the seller and/or demand, the buyer could then select which treatment he/she preferred. For example, even if chat treatment was available and/or offered to an incoming buyer, some buyers might choose not to avail themselves of discussing merchandise with an active seller representative but might choose instead to simply post a message regarding the merchandise.

For example, in one embodiment of the invention, the message receiver and transmitter 501 is set such that the threaded message/newsgroup enabler 603 is always enabled, with the other enablers 601-602, 604 not utilized. The threaded message/newsgroup enabler 603 also allows buyers to review messages left by other buyers and/or the seller, in addition to providing a capability for the buyers to leave messages. Of course, the other enablers also allow buyers to review messages left by other buyers and/or the seller.

Figure 6B:
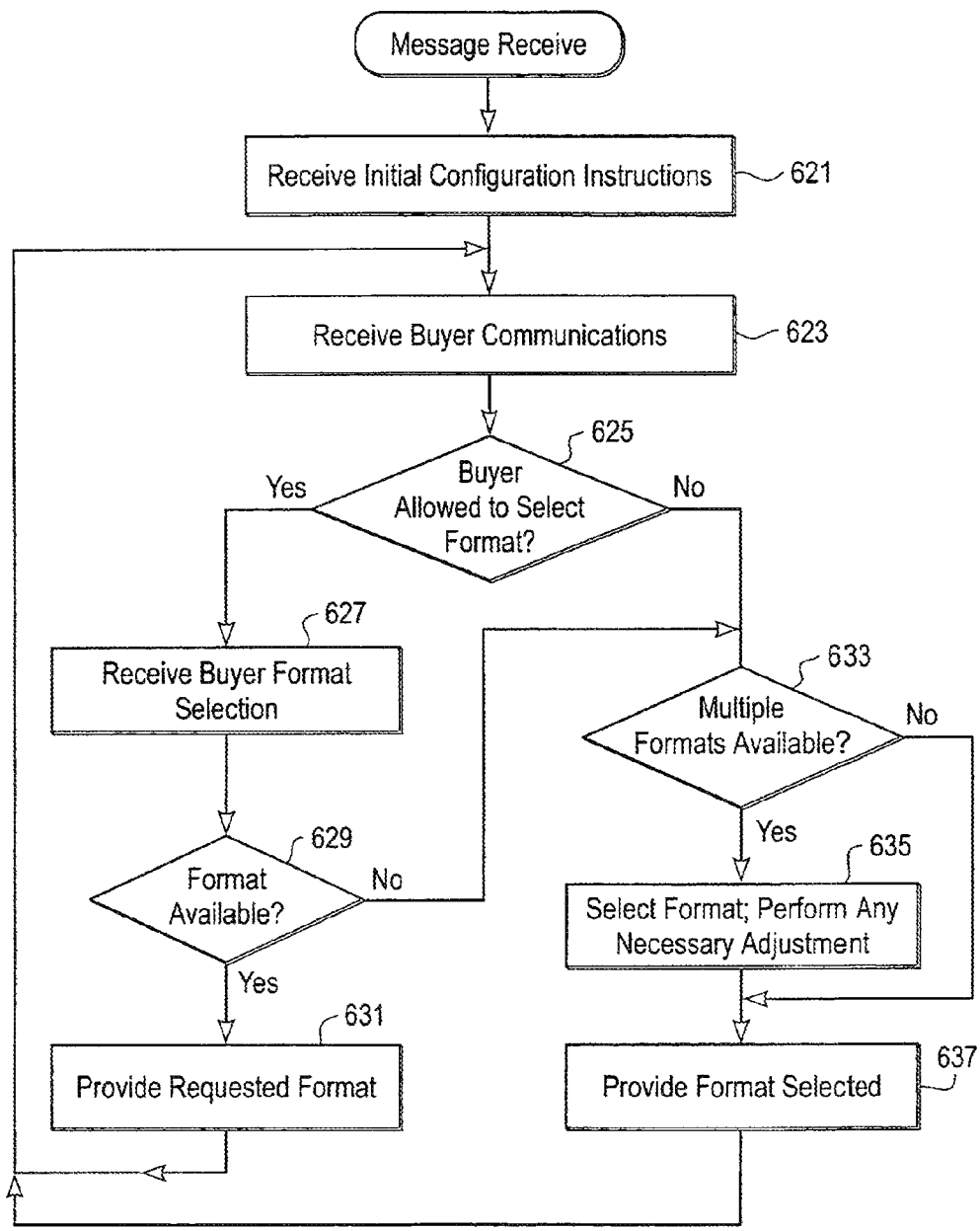
FIG. 6B is a flowchart illustrating operations of an exemplary message receiver, according to an embodiment of the invention.

FIG. 6B is a flowchart illustrating operations of an exemplary message receiver, according to an embodiment of the invention. The message receiver (e.g., the message receiver and transmitter 501) receives initial configuration instructions, typically from an operator, such as a, seller's representative (step 621). The message receiver may also typically receive updated instructions while the message receiver is in operation.

The message receiver next receives buyer communications (step 623). Of course, as previously discussed, the buyer communications may arrive from a variety of media/formats (e.g., telephone, cable television) and may be converted to another media/format for further processing. If the buyer(s) are allowed to select the communications format (e.g., auditorium chat, threaded message) (step 625), the message receiver receives and processes the buyer's requested format selection (step 627). If the buyer is not allowed to select the communications format (step 625), then the message receiver selects an appropriate format for the buyer's communication.

If the buyer is allowed to select the communications format (step 625), as discussed, then the message receiver receives the buyer's requested format selection (step 627). If the buyer's requested format is available (step 629), then the message receiver provides the buyer's requested format (step 631).

The buyer may then receive the appropriate treatment for his/her message as requested. If the buyer's requested format is not available (step 629), then the buyer's communication receives treatment in a manner similar to the situation when the buyer is not allowed to select the format. A requested format may not be available because it has reached a given capacity limit and/or a variety of other factors.

When the buyer is not allowed to select the communications format, then the message receiver determines whether multiple communications formats are available for treatment/processing of the buyer's communication (step 633). If multiple formats are not available (step 633), then the message receiver provides the format presently selected as enabled (step 637). As previously discussed, the message receiver may receive new instructions during operation, so the enabled format at one instance need not necessarily be the enabled format at another instance.

If multiple formats are available (step 633), then the message receiver selects a format for the buyer communication and performs any necessary adjustments for future communications (step 635). For example, an adjustment may be necessary to indicate how much of the format's capacity has been used. As previously discussed, the selection of a format may be conducted in a variety of ways. In one embodiment of the invention, the message receiver may be configured to process a certain percentage of messages using one treatment while processing another percentage of messages using another treatment. The message receiver may need to monitor the amount of traffic associated with the negotiating room and from time-to-time render particular treatments unavailable due to lack of capacity, according to an embodiment of the invention. Once the message receiver has selected a format (step 635), then the message receiver provides communications using the format selected (step 637).

The message receiver may continue to process communications until its operation is disengaged, typically by the operator (e.g., the merchant) associated with the negotiating room and/or the on-line group-buying sale.

Figure 7:
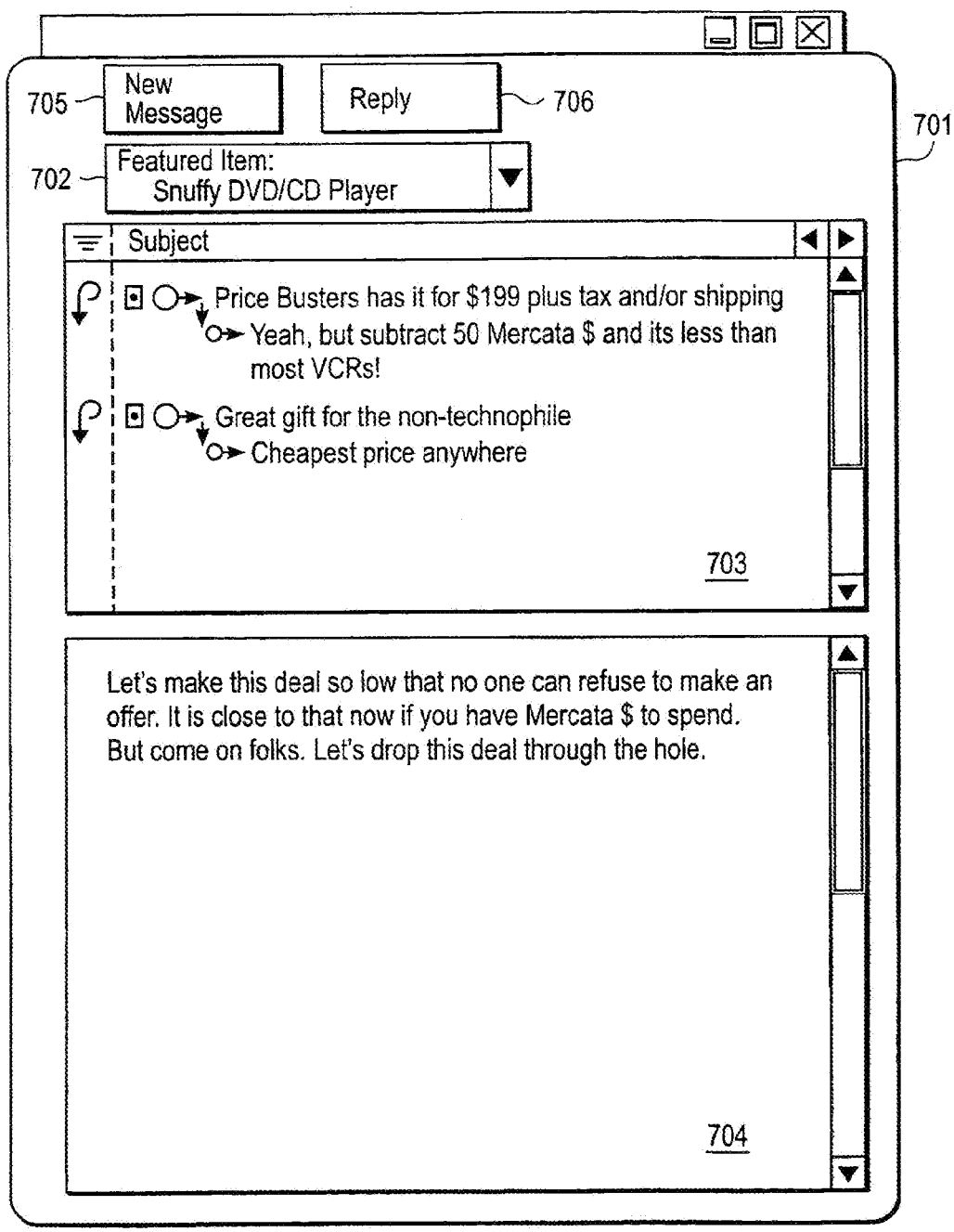
FIG. 7 illustrates a sample user interface 701 for threaded messages enabled by the threaded message/newsgroup enabler 603, according to an embodiment of the invention.

FIG. 7 illustrates a sample user interface 701 for threaded messages enabled by the threaded message/newsgroup enabler 603, according to an embodiment of the invention. The user interface 701 comprises a first portion 703 that displays messages and message threads and a second portion 704 that displays individual messages, such as messages presently being read by the buyer or messages being composed by the buyer.

Buyers may actuate a new message button 705 to create new message threads. The first portion 703 may be refreshed to show new threads as they are created. If the rate of new messages is relatively low, then buyers may be automatically shown each new message as it appears, e.g., in the second portion 704. If the rate of new messages is relatively high, then buyers may need to select particular threads for real-time display or be required to select individual messages. To follow-up on a message, a buyer actuates a reply button 706. The reply button 706 allows appropriate association between messages and helps maintain the message threads in proper order.

As previously discussed, the seller can monitor message traffic, make comments, etc. Accordingly, individual seller representatives may have very similar user interfaces to the user interface 701, although a seller representative may additionally have extra tools configured to provide functionality such as an interface into the on-line group-buying mechanism 407.

Figure 8:
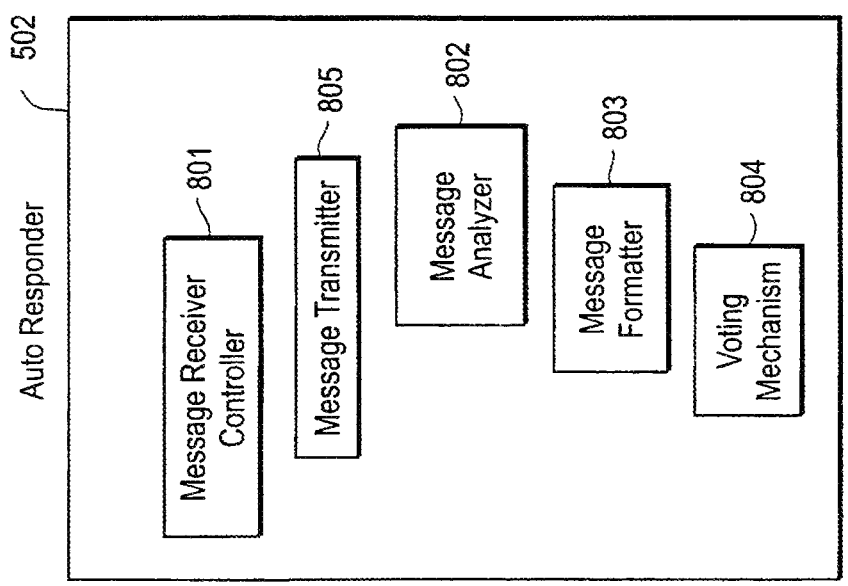
FIG. 8 illustrates a sample automated responder 502, according to an embodiment of the invention.

FIG. 8 illustrates a sample automated responder 502, according to an embodiment of the invention. The automated responder 502 comprises a message receiver controller 801, a message analyzer 802, a message formatter 803, and a voting mechanism 804, and a message transmitter 805.

The message receiver controller 801 may provide a user-configurable tool for automatically controlling the message receiver 502. For example, once a seller has configured the message receiver controller 801, the message receiver controller 801 may ensure that automatic enablement criteria are carried out for the message receiver 502 and its components.

The message analyzer 802 provides a user-configurable device for analyzing incoming buyer messages. The message analyzer 802 may perform filtering functions on incoming messages based on their content and/or direct a message to an appropriate seller representative. In some embodiments, the message analyzer 802 may analyze and group incoming buyer messages based on a sorting and key word identification of frequently asked questions ("FAQs") which once identified can easily be responded to with canned responses. In addition, the message analyzer 802 may be programmed to analyze incoming buyer messages based on key word usage so they may either be promptly and "intelligently" responded to by the message analyzer 802 itself, or routed by the message analyzer 802 to the most appropriate customer service personnel to prepare an appropriate response given the key words used in the message. For example, the message analyzer 802 may search for key words and combinations of key words (e.g., "What," "DVD," "Snuffy," "MSRP," "?"), determine that the message is seeking the manufacturer's suggested retail price for a Snuffy DVD player, and then prepare an appropriate message in response. In preparing automated responses, the message analyzer 802 may consult various data repositories, including data repositories having previously prepared responses. If an automated facility can prepare a satisfactory response to a buyer's query, then the human seller representatives and/or customer support personnel standing by to help respond to buyer questions are free to answer more complicated queries from other buyers.

The message formatter 803 can prepare outgoing messages of various sorts to buyers. For example, the message formatter 803 may receive an indication from the message analyzer 802 to access the persistent memory 504 and retrieve a previously prepared response and then modify it for transmission to a particular buyer. Of course, the tasks performed by the message formatter 803 may change depending on the types of messages received and processed by the negotiating room 401.

The voting mechanism 804 may be used in configurations in which buyers are asked to vote on various matters pertaining to a particular item for sale, such as quick real-time votes on questions of interest. For example, "How many people would be willing to wait two weeks for delivery in exchange for a $20 reduction in price?" or "How many people like the current deal and would probably make a purchase?" In this way, the operator and/or seller representative may quickly and efficiently establish consensus among the group of interested buyers, or define relevant subgroups of buyers, that will facilitate completion of one or more group sales. The votes would not necessarily be irrevocable, but they could be useful to the seller associated with the negotiating room 401 who could possibly alter the characteristics of a particular on-line group-buying sale.

The message transmitter 805 transmits messages to the seller representative 503. For example, the automated responder 502 may receive a message from the message receiver and transmitter 501 that it cannot presently process (e.g., the message is too complicated for automated processing). In such cases, the message transmitter 805 sends the message to the seller representative 503.

Figure 9A:
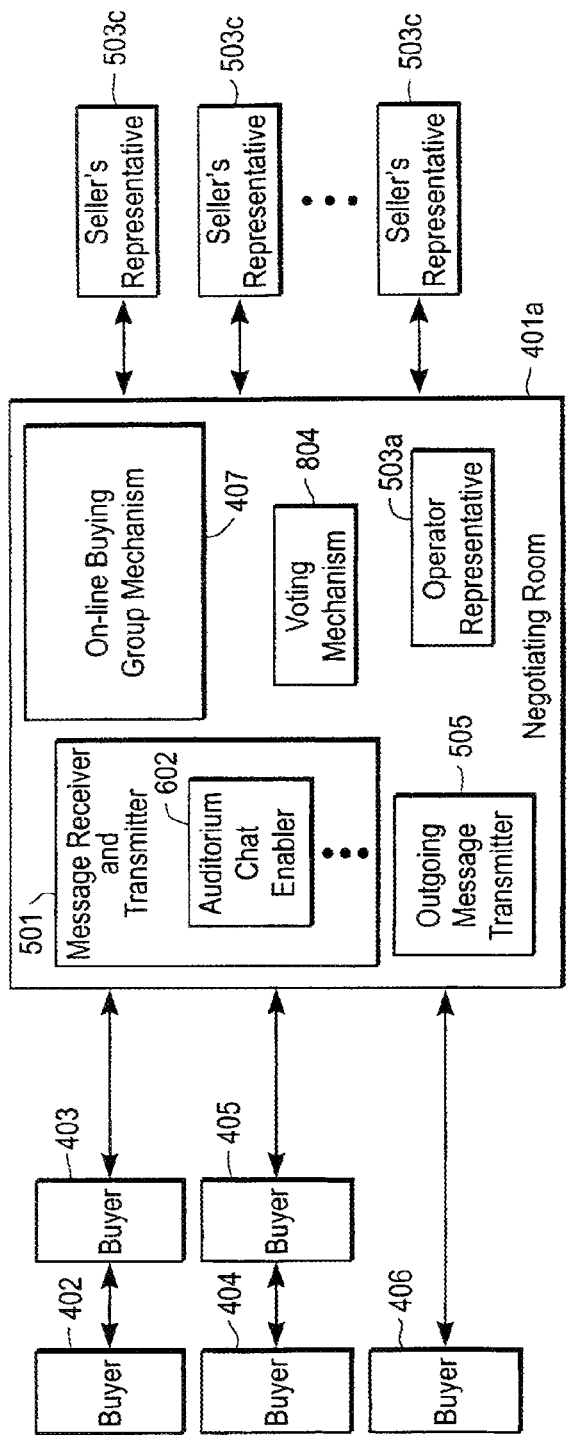
FIG. 9A illustrates a sample negotiating room in an auditorium chat configuration, according to an embodiment of the invention.

FIG. 9A illustrates a negotiating room 401 a in an auditorium chat configuration, according to an embodiment of the invention. In this embodiment, an operator (e.g., a merchant) associated with the negotiating room 401 a makes prospective buyers aware of the possibility of an on-line group-buying sale during an auditorium chat forum. For example, the operator could advertise via cable television the specific time for the auditorium chat, and/or make the auditorium chat forum known on the merchant's website (e.g., an Operator's Site or a Partner's Site). The operator may also require, although this is not strictly necessary, that prospective buyers, such as the buyers 402, 404, 406, pay some form of binding consideration (e.g., a cover charge) as an indication of their seriousness in participating in the negotiating room 401a. If consideration is collected (e.g., by the on-line group-buying mechanism 407), the consideration may, of course, be applied to the purchase price of the featured item; operators and sellers may apply (or not apply) the consideration in a variety of ways.

In this embodiment of the invention, an operator associated with the negotiating room 401 a plays the role played by the seller associated with the negotiating room 401 in FIG. 5. (Thus, the operator 401 a also typically operates the on-line group-buying mechanism as well.) An operator's representative 503a corresponds to the seller's representative 503 shown in FIG. 5, except that the operator's representative does not typically represent the seller's interests but instead represents the operator's interests. Accordingly, sellers associated with an on-line group-buying sale may provide seller's representatives 503c. In a typical configuration, each seller is represented by a seller's representative. Of course, other configurations are possible, such as multiple seller's representatives for a seller as well as one seller's representative for multiple sellers. In addition, a single seller's representative having only a single featured item may be used in some embodiments.

The operator representative 503a may announce the beginning of the auditorium chat forum. The operator representative 503a may make the announcement over all appropriate electronic network(s) using transmitting functionality provided with the operator representative utility itself and/or the outgoing message transmitter 505. In some embodiments, the outgoing message transmitter 505 may be configured to broadcast announcements to a large group of prospective buyers, e.g., buyer names from the operator's records of previous customers and/or send an announcement across an electronic network, such as an advertisement on a cable channel. Thus, in some configurations, the operator representative 503a may announce the beginning of the auditorium chat forum over a cable network, over the Internet, and over the PSTN. Such announcement may take the form of either a general announcement in advance of the auditorium chat event, or a reminder notification immediately prior to the auditorium chant event.

On-line group-buying sales conducted in the auditorium chat forum may be conducted in a faster time frame than on-line group-buying sales in other formats, although a faster time frame is not required. In addition, the auditorium chat forum may provide a special on-line group-buying sale associated with an ongoing on-line group-buying sale conducted in another format and/or the auditorium chat forum may be conducted as an on-line group-buying sale with no connection to another sale. If the online group-buying sale in an auditorium format is being conducted as a special promotion associated with another on-line group-buying sale, then the buyers 402, 404, 406 may be permitted to join the auditorium chat forum prior to the forum's inception in a manner similar to the way buyers make offers on featured items in a typical on-line group-buying sale. Those joining the buying group in this manner may indicate their desire to be automatically notified at the time the negotiating forum begins or should specified changes in the product offering or price occur.

The buyers 402, 404, 406 do not need to place an offer prior to the forum's inception, nor do they need to join the auditorium chat at its inception, although their participation should preferably begin relatively early in the on-line group-buying sale, especially since in many instances, such sales may be conducted relatively quickly (e.g., less than an hour). For example, the operator representative 503a may send an announcement such as "Welcome, shoppers to another 'Instant PowerBuy™'. In just a moment, we'll be offering to you, a fine DVD product . . . . " This announcement may be sent over a cable channel, over the Internet, over the PSTN, or another communication channel. Of course, the announcement sent over some electronic networks may not necessarily be in both audio and video formats and might even be translated into a text format.

The buyers 402, 404, 406 contact the operator's message receiver and transmitter 501. The buyers 402, 404, 406 may indicate to the message receiver and transmitter 501 that they are interested in receiving auditorium chat treatment via the auditorium chat enabler 602. Of course, in some configurations, the message receiver and transmitter 501 could be set to provide auditorium chat treatment to all incoming buyer messages. In addition, in some configurations, the buyers 402, 404, 406 may make their interest in the auditorium chat known by providing an identification number that corresponds with previously paid consideration, e.g., a cover charge.

As previously discussed, in some embodiments, the buyer 402 may arrive via a cable network, or via an appropriate back channel associated with an interactive cable network. For example, the partner 403 could be an interactive cable network that provides cable services to the buyers 402. The buyer 404 may arrive at the forum via a connection over the PSTN. For example, the partner 405 could be a local telephone service that provides cellular service to the buyer 404. The buyer 406 may access the negotiating room 401 via the seller's website. Of course, as an ordinarily skilled artisan will recognize, a variety of other possible configurations are possible.

When the operator representative 503a determines that a sufficient number of buyers have entered the negotiating forum for the featured item being offered (e.g., some high-priced specialty items may require only a few buyers), the operator representative may begin the sale or may allow the various seller's representatives to discuss their respective featured items. For example, a seller's representative could make an announcement, such as "Okay, everybody, how many of you would be interested in buying this fine Snuffy DVD Player for $120? Please decide during the next twenty minutes. Now remember, we try to make our prices extremely competitive, but if this price is too high for you, then please enter what you believe to be a more reasonable price. Again, please decide during the next twenty minutes."

The buyers 402, 404, 406 who have entered the auditorium chat forum may either accept the seller's $120 price or reject it and enter another (e.g., lower) price. For example, the buyers accessing the sale from an interactive cable system typically enter their choice through a cable remote control; the buyers accessing the sale from cellular phones use their telephone's keypad, and the buyers accessing the sale from a computer use their computer's keyboard. In a multiple seller configuration, the various seller's representatives will likely provide competing prices for their respective featured items, allowing the buyers 402, 404, 406 to choose at least one featured item from one of the competing sellers. The buyers 402, 404, 406 could even submit competing offers for the various sellers' featured items.

The voting mechanism 804 processes the incoming information from the message receiver and transmitter 501 and tallies the results and presents them to the operator representative 503a and may present appropriate results to the seller's representatives 503c. For example, in some configurations, a seller may be allowed to view results for all sellers while in other configurations, a seller may be allowed to only view results for its own featured item.

The on-line group-buying sale may be configured such that preliminary demand information may be collected from sellers before irrevocable offers are received from the buyers. For example, the seller may ask a hypothetical question (e.g., "Who will pay $100 for this product?") as a way of gauging demand before the sale actually begins. Of course, the operator, merchant, partners, and sellers may work together to structure the negotiating room experience in a variety of ways that may or may not include nonbinding voting and/or revocable offers. In any event, the voting mechanism 804 may be configured to collect both binding and non-binding responses from the buyers.

Figure 9B:
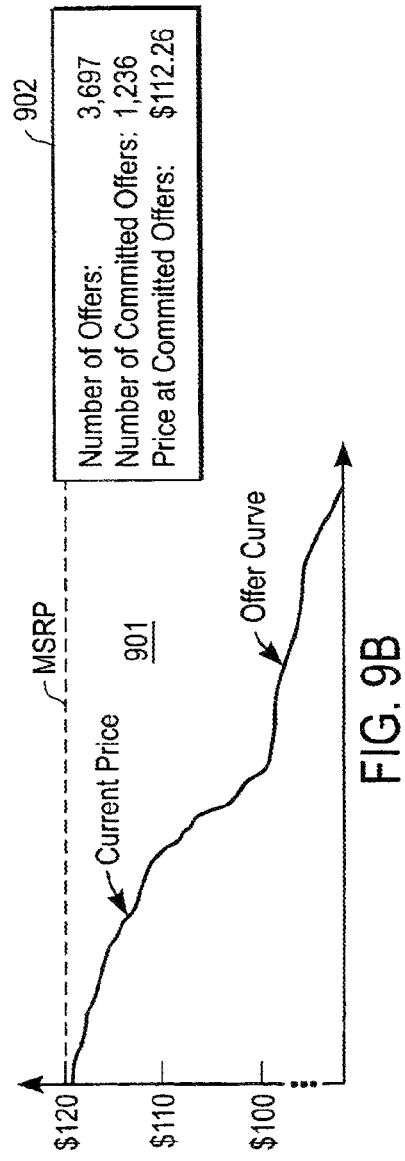
FIG. 9B provides an exemplary flash demand curve 901, according to an embodiment of the invention.

The voting mechanism 804 may present the voting results in the form of a graph. The graph may take the form of an instantaneous demand curve, also known as a "flash" demand curve. FIG. 9B provides an exemplary flash demand curve 901, according to an embodiment of the invention. The flash demand curve 901 may depict demand for a featured item among a group of prospective buyers within a bounded time period (e.g., with price along the y-axis and the number of prospective buyers along the x-axis). For example, a flash demand curve might show the demand for a particular type of DVD player among 502 prospective buyers participating in an on-line group-buying sale for the DVD player, measured within a 20-minute time period during the on-line group-buying sale. By providing such instantaneous (e.g., "flash") results, the flash demand curve 901 may provide sellers with useful information about how they should proceed with selling the featured item in the on-line group-buying sale for which the flash demand curve has been calculated. Sellers may use the flash demand curve 901 both in pre-sale hypotheticals with prospective buyers and/or in actual on-line group-buying sales. Thus, the flash demand curve 901 provides a tool for gauging pre-sale demand under certain sales assumptions and provides a tool for gauging demand during an actual sale.

The respective seller's representatives 503c may review the results provided in the flash demand curve 901 to see if the sales goals are maximized by accepting all the offers at a certain price or to consider whether sales goals would be maximized by accepting all the offers at some lower price. For example, a seller's representative might conclude that accepting all offers at or above $100 would be more likely to maximize sales goals than accepting only the offers at $120, the current price. Suppose further that 90 percent of the participants made offers at or above $100, and accepting such offers would maximize the sales goals. As an ordinarily skilled artisan will recognize, an on-line group-buying sale may be conducted with various goals in mind, such as maximizing revenue, eliminating inventory, or building market share.

Upon viewing the sales results of its flash demand curve, each seller's representative 503 could also decide where the price should be for their respective seller's featured item, as well as deciding to offer additional (or different) merchandise, according to an embodiment of the invention. For example, a seller's representative could determine that the price should remain at $120 but that additional merchandise should be offered. The sales representative 503c might also decide that the price should be lowered and additional merchandise offered. Such information may be particularly helpful when the sales representative 503c is conducting various hypothetical price/product mixes before the actual beginning of an on-line group-buying sale.

In such cases, the sales representative 503c may make an announcement such as, "Okay, folks, you've decided that $120 is too much for just the DVD player. So, howabout $110 for the DVD player? But, wait, the good folks at Snuffy also tell me that we can throw in the new James Bond DVD. So, howabout this, $110 for the DVD player and a free James Bond DVD. This time, vote either 'yes' or 'no.'"

The buyers 402, 404, 406 enter their choices again, although this time they only enter "yes" or "no" answers. The voting mechanism 804 again processes the results and presents them to the sales representative 503c. The sales representative may determine that accepting all the "yes" offers will achieve the sales goals. On the other hand, the sales representative 503c may believe that the sales goals could be best achieved by adding other merchandise to the sale. The sales representative 503c could make an announcement such as, "Okay, folks, you're killing me. Here's the deal; I can't go any lower than this: the Snuffy DVD player, the James Bond DVD, a Stuart Little DVD, and a two-year warranty for the DVD player—all for $110. That's it; that's as low as I can go. The boss is probably gonna kill me anyway. So, vote now, "Yes" for acceptance and "No" for rejection. And, please, don't forget, that your cover charge will be credited toward the purchase price. Okay, since this is important, you'll have 15 minutes to decide."

The buyers 402, 402, 406 enter their choices again. The voting mechanism 804 again tallies the results and presents them to the sales representative 503c. The sales representative 503c may announce to the group the results of the final vote and, in the case where the votes were binding and not hypothetical, the sales representative 503 may provide the purchasers with information about how and when they will receive the merchandise.

As an ordinarily skilled artisan will recognize, the sales representative 503c could conduct the sale using a variety of approaches, and could even continue to add more merchandise or lower the price further than indicated above. In addition, the sales representative 503c could even raise the price, although this would be easier to accomplish when the votes are non-binding on the buyers. For example, the sales representative 503c could add merchandise to the existing sale that would cause the price of the entire sale to go up.

The flash demand curve 901 may also include the manufacturer's suggested retail price for the featured item (where appropriate), and the flash demand curve 901 may also have some form of summary 902, according to an embodiment of the invention. The summary 902 may provide information such as the number of offers received, the number of committed offers, and the price for the committed offers.

Figure 9C:
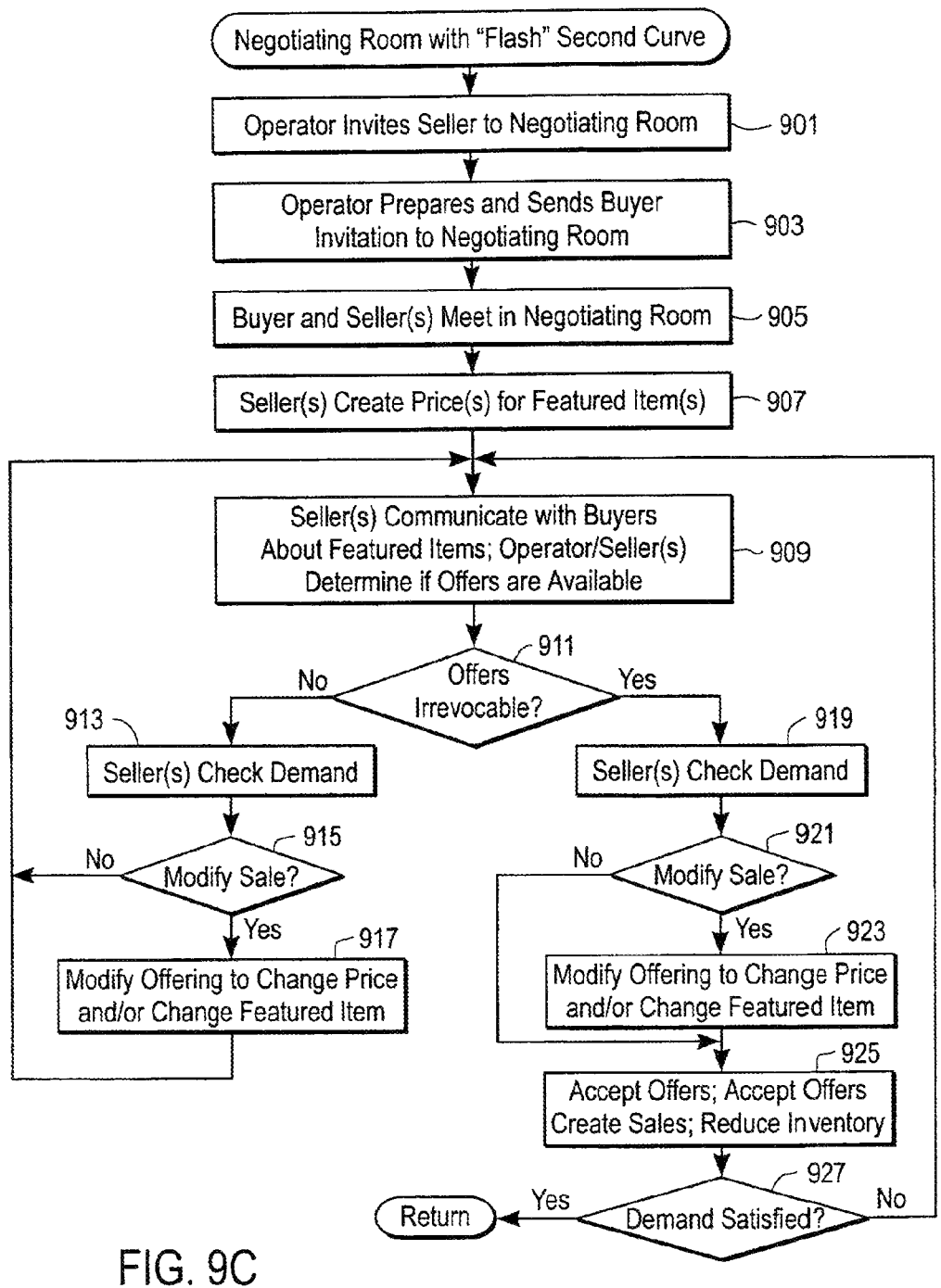
FIG. 9C is a flowchart illustrating operations of a negotiating room having a flash demand curve generation capability, according to an embodiment of the invention.

FIG. 9C is a flowchart illustrating operations of a negotiating room having a flash demand curve generation capability, according to an embodiment of the invention. For example, the negotiating room in an auditorium chat configuration shown in FIG. 9A could be operated using the flowchart shown in FIG. 9C, according to an embodiment of the invention.

An operator (e.g., the operator representative 503a) hosting the on-line group-buying sale invites seller(s) to the negotiating room (step 901). Of course, as previously discussed, the operator hosting the on-line group-buying sale may be one of the featured item sellers.

The operator prepares and sends a pre-sale announcement message, also known as a "buyer invitation" to buyers who might be interested in participating in the negotiating room experience (step 903), according to an embodiment of the invention. The buyer invitation may comprise a broadcast to a list of prospective buyers transmitted by the outgoing message transmitter 505, according to an embodiment of the invention. Of course, in some embodiments, the buyer invitation may be limited to an advertisement of a forthcoming on-line group-buying sale that could include a link to the operator's website, for example. In some embodiments, the buyer invitation may be accompanied by a coupon good toward a discount (e.g., $10 off or 5% off) if the buyer participates in the negotiating room and/or makes an accepted offer therein. In other embodiments, the buyer invitation may be passive. In some embodiments, buyers entering the operator's website at times near to the beginning of the negotiating room on-line group-buying sale may be alerted to the opportunity to participate in the negotiating room group-buying sale, such as by text on the home page of the operator or product manufacturer or by a pop-up window while browsing the operator or manufacturer's website.

The buyers and seller(s) meet in the negotiating room (step 905). Of course, in many embodiments of the invention, the "meeting" of the buyers and sellers will be a virtual meeting in that the buyers and sellers themselves may not be co-located in the same physical location. Of course, some embodiments of the invention may provide a hybrid virtual and physical negotiating room in which some buyers and some seller's representatives are co-located (e.g., where some buyers are present with seller representatives as part of a television studio audience).

The seller(s) create a price (e.g., an initial negotiating room price) for their respective featured item(s), which may provide a context for negotiations with the buyers (step 907). For example, three seller's representatives for DVD players may each determine an initial offering price for their respective featured item. Of course, each product's initial offering price does not need to be the same as the initial offering prices for the other seller's products. In fact, unequal initial offering prices are probably more likely to occur than not. Some sellers may ask for and/or obtain a flash demand curve before setting the price, according to an embodiment of the invention.

The seller(s) communicate information about its/their featured item offerings with the buyers (step 909). For example, the seller(s) may engage in various forms of negotiating room communications with the buyers, including one or more of the formats discussed herein. The communications may concern featured item advantages, limitations, warranties, and/or any communication about a featured item that may be of interest to a potential buyer.

Offers received from buyers are a form of communication, just as prices provided by sellers are a form of communication. The seller(s) may use offer information received from buyers as a way of directing the course of the negotiations with the buyers and with the negotiating room on-line group-buying sale. Accordingly, in some instances, the seller(s) may not want the offers received from the buyers to be irrevocable (or not initially irrevocable). For example, sample pricing votes may be taken using the voting mechanism 804. Thus, in such situations, the sellers and/or the merchant and/or the operator may need to determine if offers received from buyers are irrevocable on the buyers and/or when offers become irrevocable. Of course, such information needs to be communicated to the buyers. In those instances where the negotiating room sale is a breakout of an ongoing on-line group-buying sale, then some offers may have already been determined to be irrevocable before the negotiating room on-line group-buying sale breakout occurs. On the other hand, the seller(s) could announce that participating buyers are released (or releasable) from previous offers if they participated in the negotiating room sale. (Some buyers may wish to retain their irrevocable offers, e.g., they cannot participate in the negotiating room on-line group-buying sale and want the featured item at the price of their previously submit offer. Accordingly, in some embodiments, these buyers may be permitted to retain their irrevocable offers.) In general, in a multiple seller on-line group-buying sale, if one seller is using irrevocable offers, then the other sellers will typically be compelled to have irrevocable offers as well; the merchant/operator may need to arbitrate when offers become irrevocable in some instances. Of course, the sale may iterate through several cycles of non-binding, revocable offers before the received offers become irrevocable.

If offers are not binding and revocable (step 911), then the seller(s) check demand for the featured item (step 913). The seller may check demand by simply reviewing the message traffic in the negotiating room (e.g., reading messages, listening to comments), by taking a poll using the voting mechanism 804, and/or by reviewing the results of a flash demand curve. For example, the operator (e.g., the merchant 401*a*) may allow a flash demand curve to be determined and provides the results to the seller representative(s). The seller representative(s) may then check the flash demand curve for their respective featured item(s). If the seller's check indicates to the seller representative(s) that demand has not been sufficiently met (step 915), then the seller representative(s) may modify the featured item offering (step 917). The seller representative(s) may choose to change the price for the featured items) and/or change the featured item(s) themselves (e.g., adding an additional product, a service contract, etc.). Of course, the seller representative(s) may choose not to alter the featured item's price and also choose not to modify the featured item offering to include additional featured items.

The seller representative(s) may choose to iterate through the non-binding, revocable offer steps for any arbitrary length of time before making the offers irrevocable. In addition, in one embodiment of the invention, the seller representative(s) may opt to never make the offers irrevocable and may additionally choose to reward the buyer's for their participation in the negotiating room (e.g., by providing them with discount coupons).

If the offers become irrevocable (step 911), then the seller's representatives check demand (step 919). As previously discussed, the seller's representatives can check demand informally by reviewing buyer comments, and/or they can ask for some form of a vote to be taken, and/or they can consult the flash demand curve 901. If the seller representative's check of demand indicates that the sale should be modified (step 921), then the seller may modify the featured item's price and/or change the mix of featured items offered, as previously discussed (step 923).

Since the offers received from buyers are irrevocable, the seller representative(s) determine how many of the offers received can be accepted (step 925). The seller(s) may receive enough offers to satisfy demand for the featured item, but the seller(s) may also need to determine if the offers can be accepted and still attain the seller's goals for the sale. For example, a seller may determine that demand could only be met by accepting 450 offers that includes 45 offers at prices substantially below the level of profitability required by the seller. In other words, the seller may determine that at least some of the offers cannot be accepted. The seller representative(s) may accept offers in the same manner used for an on-line group-buying sale outside of a negotiating room (e.g., a non-negotiating room on-line group-buying sale). In determining which offers to accept, the seller representative may benefit from the use of a pricing tool. A sample pricing tool is described in U.S. application Ser. No. 09/281,859, "Dynamic Market Equilibrium Management System, Process and Article of Manufacture," which has been previously incorporated by reference herein. Since accepted offers create sales, the seller representative(s) may reduce inventory accordingly.

The seller representative next determines whether demand has been satisfied for the featured item (step 927). The seller representative may determine that demand has been satisfied in a number of ways. One way to decide that demand has been satisfied is to have no remaining inventory, i.e., all units of featured items have been sold. Another way of determining that demand has been satisfied is to determine that all units of featured items that could be sold above some given price have been sold, e.g., the seller representative cannot submit a lower price and still attain sales objectives.

If demand has not been met (step 927), then the seller returns to communicating with the buyers (step 909). If demand has been met (step 927), then the on-line group-buying sale in the negotiating room may conclude. The seller(s) communications will likely include informing the buyers of the modified offers (step 909). The steps of announcing offers, checking demand, and modifying offers continues until either demand is satisfied or until the merchant/operator and/or the seller(s) decide to conclude the online group-buying sale. The seller(s) may even accept some offers before modifying the price of the featured item and or the set of products/services in a featured item. In a preferred embodiment, each time the seller(s) lowers the price and/or adds more products/services to the featured item, the buyers already having accepted offers receive the benefits of the seller(s)' new offering.

In one embodiment of the invention, the seller representative may invite during an on-line group-buying sale (e.g., a sale designed to last three days) a small set of buyers (e.g., 100 buyers) to meet the seller representative in the negotiating room. The seller representative may then complete the steps shown in FIG. 9C in a relatively short time period (e.g., 1 hour) and use the data generated from the negotiating room to modify the characteristics of the ongoing on-line group-buying sale and/or future on-line group-buying sales. For example, the seller representative could learn through from the negotiating room sale that the price curve for the featured item was much steeper than previously believed. In other words, the negotiating room may provide the seller representative with up-to-date, accurate information regarding the interests of the precise set of buyers participating in the on-line group-buying sale.

Figure 9D:
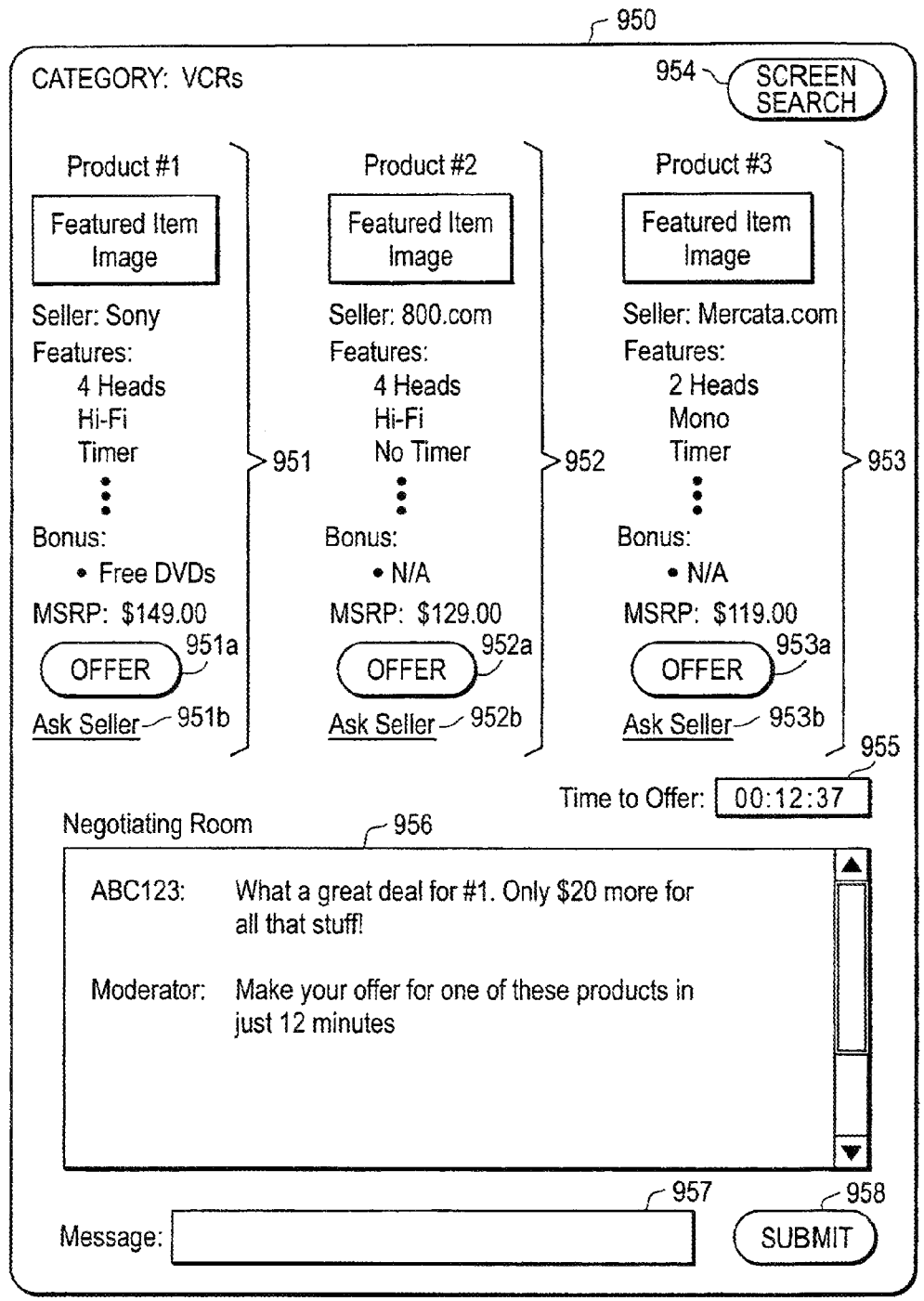
FIG. 9D is a sample buyer screen 950 associated with multiple featured item offerings from multiple sellers, according to an embodiment of the invention.

FIG. 9D is a sample buyer screen 950 associated with multiple featured item offerings of multiple sellers, according to an embodiment of the invention. The sample buyer screen 950 represents a buyer screen typically for use by a buyer engaging an embodiment of the negotiating room from a computer. Of course, the buyer screen 950 could be used by buyers accessing the negotiating room from other platforms, such as via telephone, hand-held computer, personal data assistant, portable computing device, cable television, but each platform would likely have a related (similar) user interface that took advantage of each platform's strengths while minimizing its weaknesses.

The buyer screen 950 shows three featured items 951-953, typically from three different sellers, available for purchase during the on-line group-buying sale associated with the negotiating room, according to an embodiment of the invention. Of course, the buyer screen 950 could show more or fewer products/services. Each product/service offered for sale includes an offer button (e.g., an offer button 951*a*) whose actuation enables a buyer to submit an offer for the corresponding product/service, according to an embodiment of the invention. The offer button 951 a may be a hypertext link, for example. Each product/service offered for sale also includes an "ask the seller" button (e.g., an offer button 951*b*) whose actuation initiates negotiating room communications with the seller, according to an embodiment of the invention. Of course, the negotiating room communications may use any of the communications formats discussed herein.

The buyer screen 950 includes a screen refresh button 954 to allow the buyer operating the buyer screen 950 to receive updates for the featured items 951-953, according to an embodiment of the invention. For example, the refresh button 954 may be especially helpful when the buyer has not refreshed the buyer screen 950 for a relatively long period of time during which the current price of one or more of the featured items 951-953 has decreased. Of course, some displays will automatically update themselves, and in such cases, the screen refresh button 954 may not be necessary.

A time-to-offer clock 955 displays the amount of time remaining before the next calculation of the flash demand curve. In some embodiments of the invention, the buyers may need to submit their offers prior to the calculation of the flash demand curve in order for their offer to be considered by the seller. In other words, the sale may close using only the offers received before the calculation of the flash demand curve. In other embodiments of the invention, the buyers may not necessarily need to have an offer submitted prior to calculation of the flash demand curve, but if the buyer does not submit an offer before the calculation of the flash demand curve, then the buyer's input may not be considered by the seller (e.g., not considered by the seller in the seller's next determination of the featured item's price). Of course, the flash demand curve's calculation and the close of the on-line group-buying sale may not necessarily coincide in many embodiments of the invention. In other embodiments of the invention, the flash demand curve's calculation may occur without notice. While in other embodiments of the invention, the flash demand curve may be calculated continuously.

The buyer screen 950 may also include a negotiating room communication area 956 that displays communications from the buyers/seller(s) in the negotiating room, according to an embodiment of the invention. For example, the buyer screen 950 may display a thread from a message board or interact with an auditorium chat facility. The buyer screen 950 may also include functionality allowing the buyer to communicate in the negotiating room using a message composition facility 957 and a submit button 958 whose actuation causes a message to be sent to the seller and/or the negotiating room manager.

Using the buyer screen 950, a buyer can choose a featured item and submit an offer for the selected featured item and/or play one seller against another while possibly risking obtaining both items. In other words, a buyer could submit two offers that would have the effect of saying, "I'll take product A if the price drops to $Y or product B if the price reaches $X." Of course, both events might transpire (i.e., Product A's price drops to $Y and product B's price drops to $X), in which case the buyer would have both orders filled. In another embodiment of the invention, the buyer would be permitted to make his offer for Product A conditional on the price drop on Product B (e.g., "I'11 take product A at the current price unless Product B reaches $X, in which case I'll take product B) or other factors external to Product A.

Figure 9E:
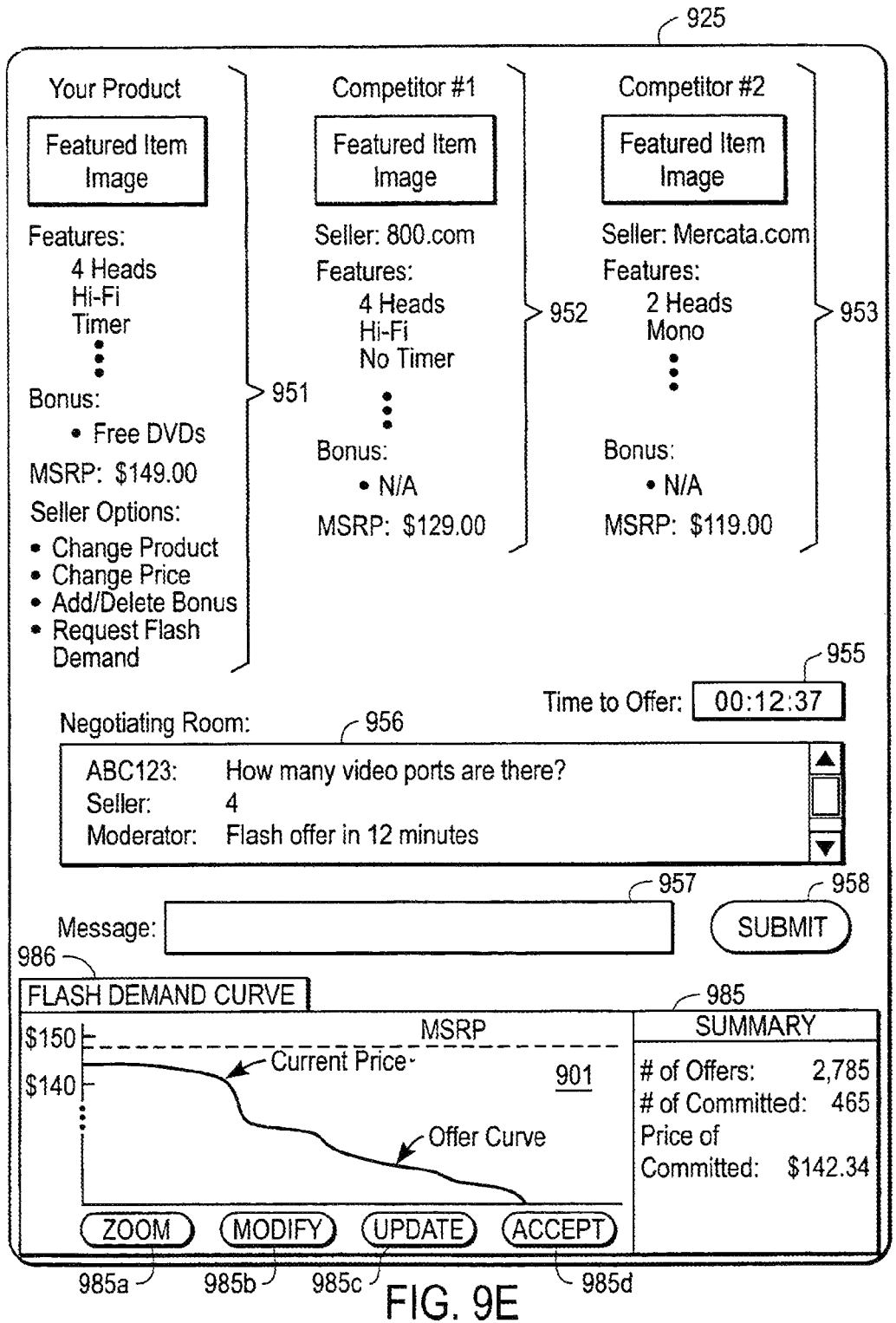
FIG. 9E is a sample seller screen 925 associated with multiple featured item offerings from multiple sellers, according to an embodiment of the invention.

FIG. 9E is a sample seller screen 925 associated with multiple featured item offerings from multiple sellers, according to an embodiment of the invention. The sample seller screen 925 represents a seller screen typically configured for use by a seller engaging the negotiating room from a computer. Of course, the seller screen 925 could be used by sellers accessing the negotiating room from other platforms, but each platform would likely have a related (similar) user interface that took advantage of each platform's strengths while minimizing its weaknesses.

The seller screen 925 shows the three featured items 951-953, shown in FIG. 9D. The featured item 951 represents the product/service offered for sale by the seller associated with the seller screen 925, according to an embodiment of the invention. Of course, the seller screen 925 can be designed to display equal amounts information for all the featured items offered (or to display even more information about competitor's featured items); however, it is more likely that the seller will desire to have more information about his/her own featured items as a way of communicating more effectively about such products/services.

A time-to-offer clock 955 displays the time remaining for buyers to submit offers prior to the next computation of an instance of the flash demand curve 901, according to an embodiment of the invention. Of course, the time-to-offer clock 955 is not strictly necessary for the seller(s), but many sellers may appreciate knowing how much time remains before the next computation of the flash demand curve.

The seller screen 925 may also include a negotiating room communication area 956 that displays communications arising between the buyers/seller(s) in the negotiating room, according to an embodiment of the invention. For example, the seller may see a thread from a message board or interact with an auditorium chat facility. The seller screen 925 may also include functionality allowing the seller to communicate in the negotiating room using a message composition facility 957 and a submit button 958 whose actuation causes a message to be sent to a buyer(s) and/or the negotiating room manager/operator (e.g., the operator representative).

The seller screen 925 provides a curve display 986 that permits the seller to modify a product offering on the fly, request a flash demand curve, and review summary information for competing sellers' featured items, according to an embodiment of the invention. The seller may review previous instances of the flash demand curve 901 and directly manipulate the featured item's price/offer curve. The seller screen 925 also presents summary information in a tabular form, and the seller screen 925 provides the seller with functionality to respond to messages in the negotiating room. In some embodiments, the seller screen 925 may include a pricing tool and/or access to a pricing tool, such as the pricing tool disclosed in the co-pending application entitled "Dynamic Market Equilibrium Management System, Process and Article of Manufacture," previously incorporated herein by reference.

As discussed above, the seller screen 925 may also include the curve display 986 for the flash demand curve 901, according to an embodiment of the invention. The curve display 986 may provide a display of the flash demand curve 901, comprising the present offer curve for the seller's featured item and may also include the manufacturer's suggested retail price for the featured item. The curve display 986 may also provide summary information 985 such as the number of offers received, the number of committed offers, and the price of the committed offers.

The curve display 986 may further include a zoom button 985*a* that allows the seller to zoom in on a portion of the flash demand curve 901; a modify button 985*b* that allows the seller to modify the offer curve, an update button 985*c* whose actuation provides an instant update of the number of offers received, and an accept button 985*d* whose actuation sends the seller's acceptance of one or more received buyer offers not previously accepted. The curve display 985 need not necessarily include all of these buttons and may even include additional buttons; however, the feature set shown here is preferred.

Actuation of the modify button 985*b* allows the seller to modify the offer curve for the featured item. Of course, modifying the offer curve may result in a new price for the featured item. For example, if the seller modifies the offer curve, then some received buyer offers that could not previously be accepted might now become acceptable.

Operators, merchants, and sellers may use negotiating room on-line group-buying sales for a variety of purposes and in a variety of formats and configurations. In one embodiment of the invention, a negotiating room on-line group-buying sale may be used to collect highly up-to-date demand data which may then be applied to ongoing and/or future or concurrent on-line group-buying sales for the same or similar featured items.

Figure 9F:
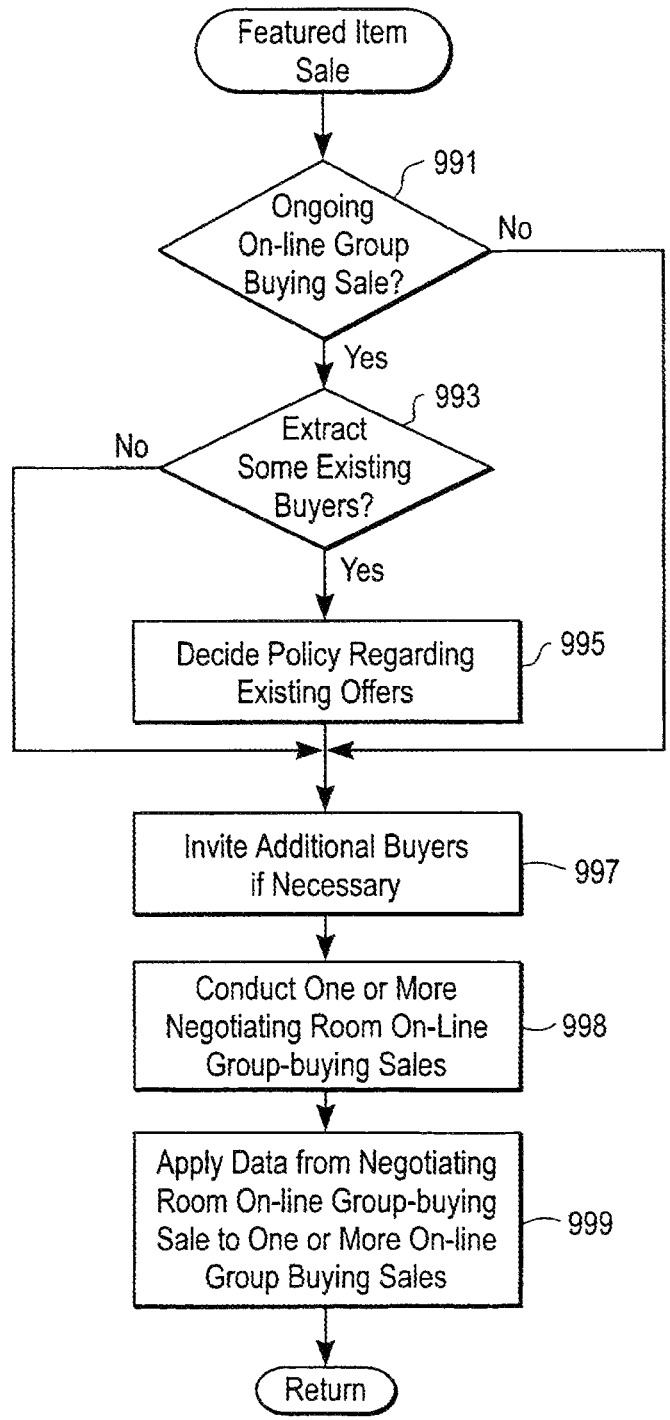
FIG. 9F is a flowchart illustrating a featured item sale involving at least one negotiating room on-line group-buying sale and at least one on-line group-buying sale, according to an embodiment of the invention.

FIG. 9F is a flowchart illustrating a featured item sale involving at least one negotiating room on-line group-buying sale and at least one on-line group-buying sale, according to an embodiment of the invention.

The seller may have already begun selling a featured item in an on-line group-buying sale. For example, the seller may plan to run an on-line group-buying sale for three days and use a negotiating room on-line group-buying sale as a tool for providing accurate, up-to-date demand data for featured item of the on-line group-buying sale.

If an on-line group-buying sale is in progress (step 991), then the seller may invite buyers currently participating in the on-line group-buying sale to participate in the negotiating room on-line group-buying sale (step 993), as well as inviting other buyers in order to maximize overall buyer involvement. The notification to existing members of the buying group may be accomplished by use of instant messaging technology to provide text, voice or instant video messages to such buyers, via cell phones, PDA's, beepers and the like. Ordinarily, previously received irrevocable offers from the buyers may carryover to and become part of the market dynamics involved in the negotiating room on-line group-buying sale, although this is not strictly required. The involvement of existing buyers' previous offers in the negotiating room on-line group-buying sale (step 993) may require the operator or seller to establish policies to apply regarding the existing buyers and their participation in the negotiating room on-line group-buying sale (step 995) in order to appropriately protect the expectation of such parties and honor any irrevocable offers in place. While these policies might hinder the flexibility of the seller to offer different featured items, they typically would not preclude the seller from improving the bargain to buyers by lowering price, adding accessories, extending warranties and the like. In essence, the buyers making offers before the forum begins would not be penalized for doing so but instead would receive all benefits of favorable negotiations among the buying group and seller(s) that might take place later in the forum, according to an embodiment of the invention.

If an on-line group-buying sale is not ongoing (step 991), or if existing buyers from an ongoing on-line group-buying sale will not be invited to the negotiating room on-line group-buying sale (step 993), or if the seller decides that additional buyers should be included in the negotiating room on-line group-buying sale, then the seller may invite additional buyers (step 997).

Once the seller has a sufficient buyer group, then the seller conducts one or more negotiating room on-line group-buying sales for the featured item (step 998). As previously discussed, in an on-line group-buying sale, the seller may alter the featured item mix by adding and removing new products and services. Accordingly, a seller may run several negotiating room on-line group-buying sales to determine the appropriate mix of products/services to achieve the goals for a larger series of on-line group-buying sales. In other words, the negotiating room on-line group-buying sale provides the seller with a tool for testing various featured item mixes and sales strategies with a real buying group.

The seller may then apply data collected (e.g., demand data and feature item data) from the negotiating room on-line group-buying sale to one or more on-line group-buying sales (step 999). While on-line group-buying sales may be run for any time duration, online group-buying sales tend to run for a number days while negotiating room on-line group-buying sales tend to run for a much more limited time period. Thus, a seller may apply the data collected from a negotiating room on-line group-buying sale to one or more on-line group-buying sales conducted over a longer time period with a substantially larger number of featured items available for sale.

Figure 10:
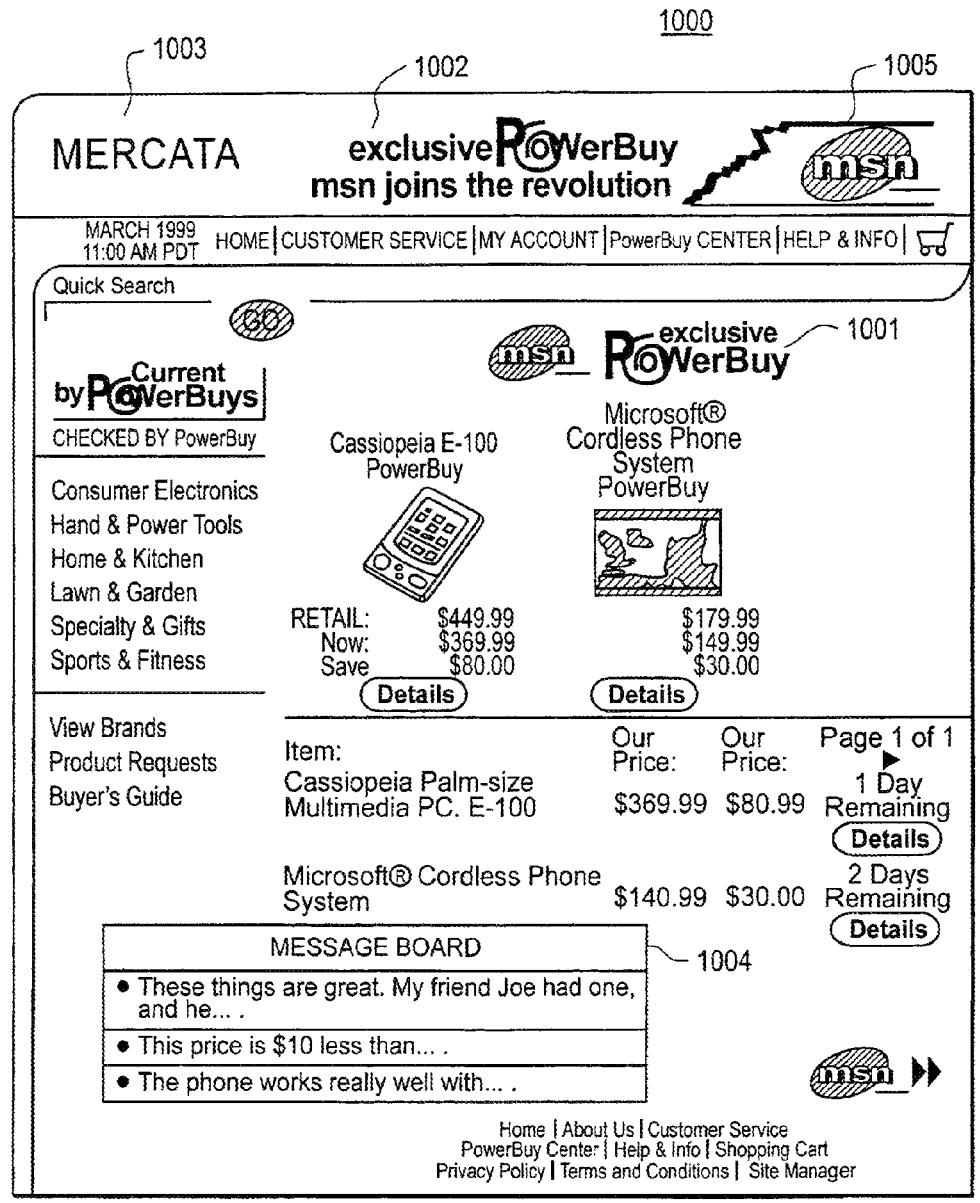
FIG. 10 shows an exemplary screen display 1000 that may be used to describe a featured item on a computer monitor, according to an embodiment of the invention.
Figure 11A:
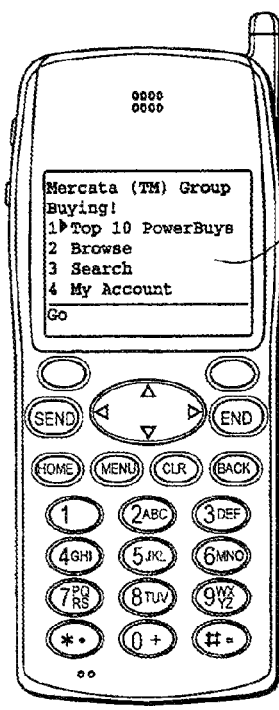
FIGS. 11A-11D show exemplary screen displays 1101-1104 that may be used to describe an on-line group-buying sale on a telephone 1100, according to an embodiment of the invention.
Figure 11B:
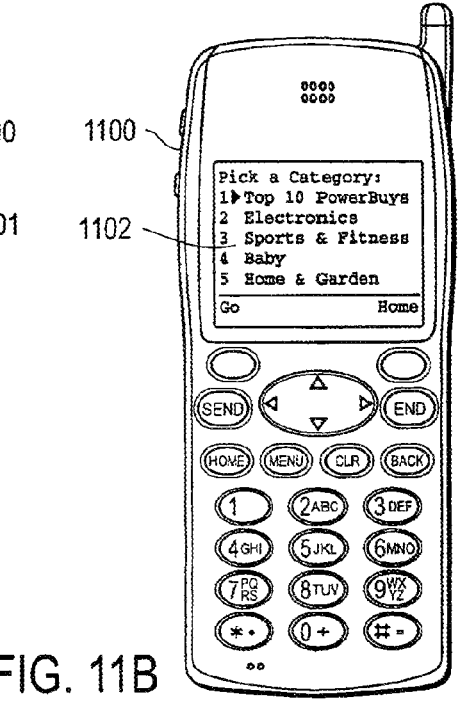
Figure 11C:
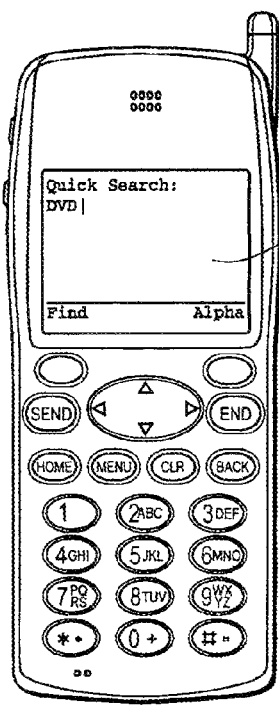
Figure 11D:
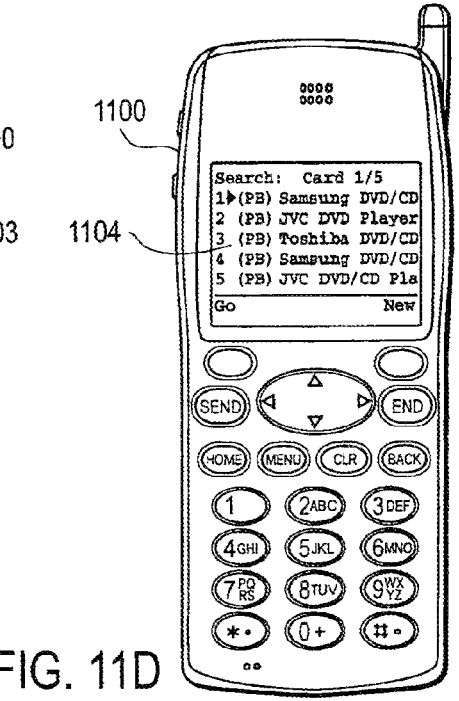
Figure 12A:
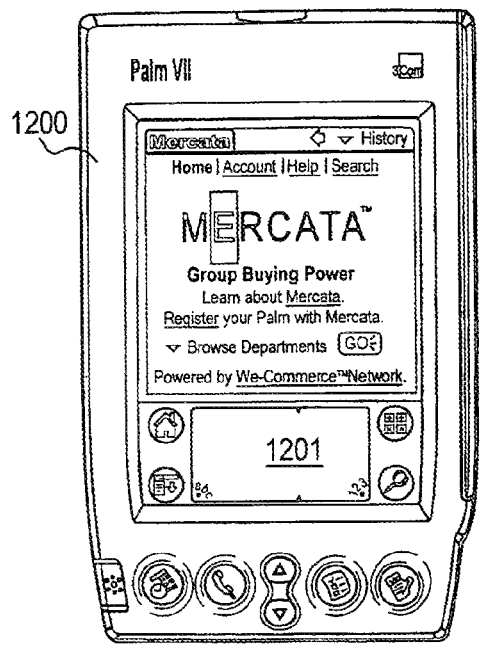
FIGS. 12A-12D show exemplary screen displays 1201-1204 that may be used to describe an on-line group-buying sale on a portable computing device 1200, according to an embodiment of the invention.
Figure 12B:
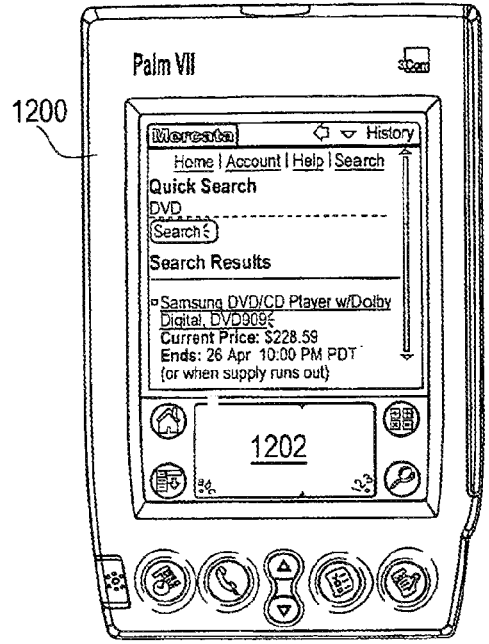
Figure 12C:
Figure 12D:
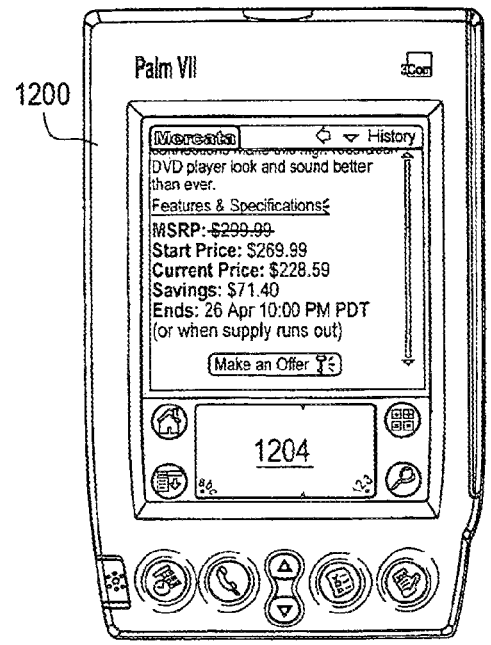

As previously discussed, buyers may access and interact with the invention using a number of different platforms. FIG. 10 shows an exemplary screen display 1000 that may be used to describe a featured item on a computer monitor, according to an embodiment of the invention.

While many displays are possible, the display 1000 would typically be associated with an embodiment of the invention related to an exclusive PowerBuy™. (For more details on exclusive PowerBuys™ embodiments, see U.S. application Ser. No. 09/409,237, "System and Method for Extension of Group-Buying Throughout the Internet," previously incorporated herein by reference.) The display 1000 includes exclusivity indicators 1001, 1002 and a partner identifier 1005, as well as an operator's identifier 1003. Of course, one of ordinary skill in the art will recognize that providing an exclusive PowerBuy™ to a given partner does not necessarily require logos identifying the operator or the Partner. On the other hand, such private label or co-branded features may render an exclusive scenario more attractive to either the partner and/or the operator. A representative display for nonexclusive PowerBuys™ (as well as other forms of on-line group-buying sales) could be quite similar to the display 1000 albeit without the references to exclusivity 1001, 1002, according to an embodiment of the invention. The display 1000 also includes a group communications display 1004 that allows customers to share ideas about the featured items offered on the display 1000. The group communications display 1004 shown in FIG. 10 has the format of a message board in which customers may post messages about the products. As an ordinarily skilled artisan will recognize, other group communications media may be used, such as a chat facility. An ordinarily skilled artisan will recognize the possibilities for many variations in the display provided to buyers accessing on-line group-buying sales.

FIGS. 11A-11D show exemplary screen displays 1101-1104 that may be used to describe an on-line group-buying sale on a telephone 1100, according to an embodiment of the invention. The telephone 1100 is a telephone having a visual display, such as is commonly associated with cellular telephones; however, as an ordinarily skilled artisan will recognize, the invention is equally applicable to telephones that provide information in an aural only format, such as a conventional touch-tone telephone. Of course, the same information could be communicated audibly in this format.

An initial display 1101 provides a buyer with a variety of selections that may condition how the buyer proceeds; e.g., the display 1101 may represent the top of a menu tree for the buyer. Suppose, for example, that the buyer chooses to browse through a list of featured items for various on-line group-buying sales. In such a case, the buyer is then directed to a display, such as a display 1102, that allows the buyer to choose a product/service category that represents his further interests. On the other hand, the buyer may alternatively choose from the display 1101 to search for a particular featured item. In such a case, the buyer may be directed to a display, such as a display 1103, that allows the buyer to enter some form of description for the product/service that interests the buyer. Suppose the buyer enters a description such as "DVD" and then actuates a "find" utility. In this case, the on-line group-buying mechanism may eventually provide a display, such as a display 1104, to the buyer that provides the results of the search requested by the buyer. Of course, a buyer could utilize voice-activated prompts to accomplish participation in a negotiating room and/or on-line group-buying sale using this device.

FIGS. 12A-12D show exemplary screen displays 1201-1204 that may be used to describe an on-line group-buying sale on a portable computing device 1200, according to an embodiment of the invention. The portable computing device 1200 is of the type conventionally known as a Palm Pilot; however, as an ordinarily skilled artisan will recognize, the invention is equally applicable to other forms of portable computers.

An initial display 1201 provides a buyer with a variety of selections that may condition how the buyer proceeds; e.g., the display 1201 may represent the top of a menu tree for the buyer. Suppose, for example, that the buyer chooses to search for a particular featured item. In such a case, the buyer may be directed to a display, such as a display 1202, that allows the buyer to enter some form of description for the product/service that interests the buyer. Suppose the buyer enters a description such as "DVD" and then actuates a "find" facility. In this case, the on-line group-buying mechanism will eventually provide search results, such as a display 1203-1204, to the buyer that provides the results of the search requested by the buyer. For example, the display 1203-1204 provides detailed information about a particular DVD player of interest to the buyer using the portable computing device 1200.

Figure 13:
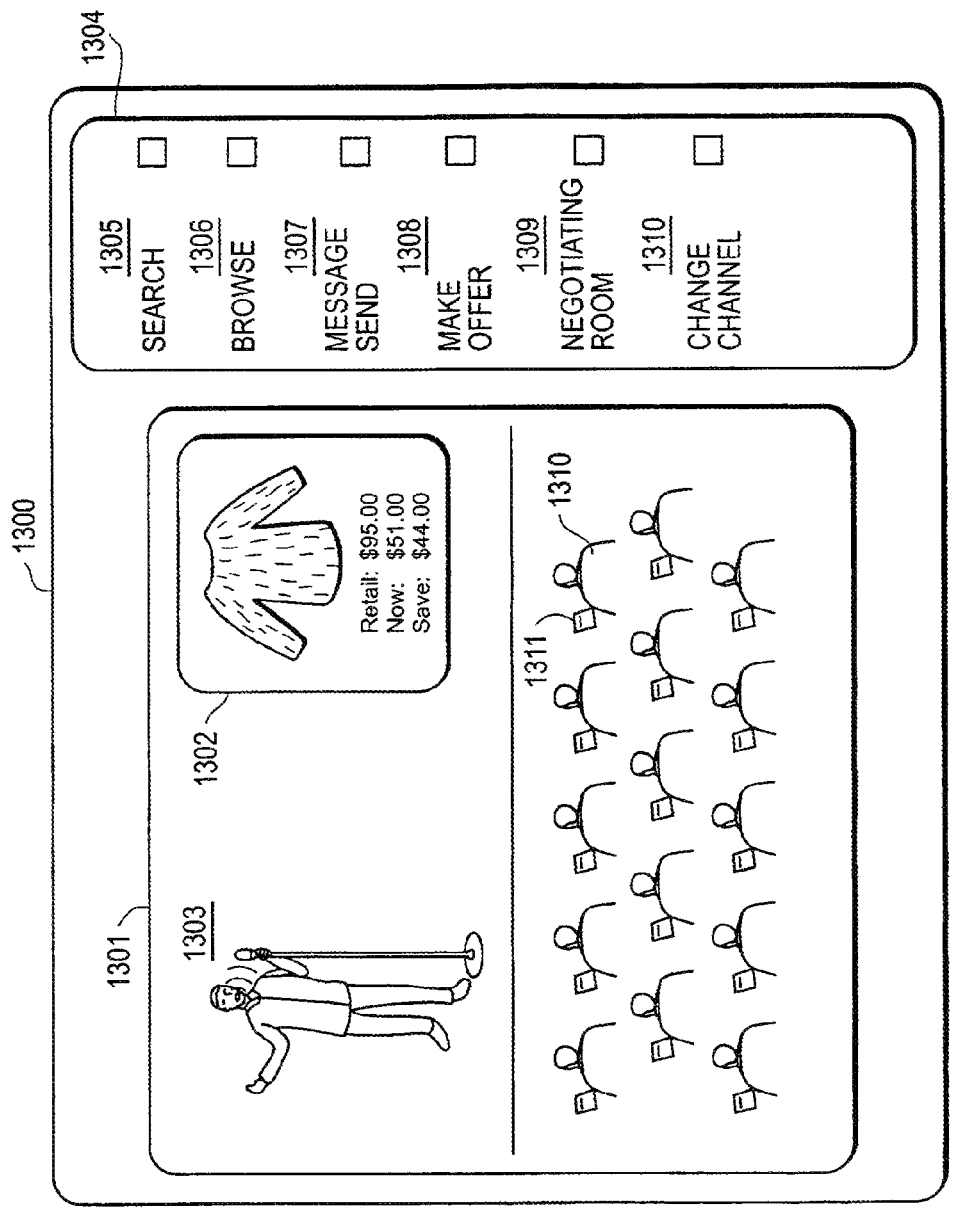
FIG. 13 shows an exemplary screen display 1300 that may be used to describe an on-line group-buying sale in a cable television embodiment of a negotiating room, according to an embodiment of the invention.

FIG. 13 shows an exemplary screen display 1300 that may be used to describe an on-line group-buying sale in a cable television embodiment of a negotiating room, according to an embodiment of the invention. The screen display 1300 is particularly appropriate in a two-way interactive cable embodiment, but an ordinarily skilled artisan will recognize that the display 1300, or other similar displays, are equally applicable to other broadcast environments. The screen display 1300 may be suitable for display on a viewing device such as television screen, according to embodiments of the invention. Of course, viewers (buyers) of the screen display 1300 may participate in the on-line group-buying sale displayed.

A broadcast display 1301 illustrates activities conducted in a negotiating room environment with a human host 1303. To potentially generate increased buyer interest and/or add entertainment value to the group-buying experience in the television environment, the human host 1303 could be a celebrity hired by the operator of a particular seller or partner to moderate the on-line group-buying sale. For example, a live "PowerBuy™ Broadcast" utilizing the negotiating room tools could be programmed to appear during related sports programming and feature a prominent athlete serving as a moderator of the group-buying sale. The host 1303 could be accompanied by one or more seller representatives competing to make sales to a large in studio and television audience of potential buyers. Alternatively, the host 1303 could have authority to reduce prices or exchange featured items beforehand thereby reducing (and possibly eliminating) the need for direct involvement by the sellers. A featured item window 1302 displays the featured item and information about the featured item in the on-line group-buying sale. A studio audience 1310 may interact with the negotiating room using remote devices 1311. The remote devices 1311 may resemble the typical remote devices used by consumers of interactive television in some embodiments. In other embodiments, the remote devices 1311 may provide unique capabilities, while in still other embodiments, the remote devices 1311 may simply allow the studio audience 1310 to submit votes and/or an offer for the featured item. Of course, the studio audience may also interact with the host 1303 verbally. An ordinarily skilled artisan will recognize that the programming content of the broadcast display 1301 may use a variety of formats without departing from the spirit of the negotiating room disclosed herein. For example, some embodiments may not have the host 1303 and/or the studio audience 1310. Other embodiments could maximize the entertainment value of the negotiating room communication tools in a television audience setting by creating group leaders, one or more winning buyers (e.g., the buyer making the offer closest to the final featured item price would receive the featured item free and/or some other prize), and the like.

A menu 1304 provides the viewer with a number of interactive choices for participating in the on-line group-buying sale associated with the broadcast display 1301. Similar to the other platforms disclosed herein, a prospective buyer may use a search utility 1305 to conduct featured item searches, a browse utility 1306 to scan through lists of featured items, a message composition and send utility 1307 to compose messages to other buyers and/or seller(s), a make an offer utility 1308 to develop and send an offer to a seller(s), and a negotiating room doorway utility 1309 whose actuation places (or attempts to place) the buyer in the negotiating room in some virtual fashion. The menu 1304 may also include other more conventional features, such as a change channel utility 1310 and an electronic program guide (not pictured).

Depending upon interest and network capacity, an operator of the interactive cable television network that broadcasts the signal for the display 1300 may choose to offer more than one negotiation room on-line group-buying sale at a time. In some instances, the operator may also wish to schedule negotiation room sales and possibly provide a sales schedule to prospective buyers. In fact, the operator/seller(s)/merchant may each provide a utility for notifying buyers when particular negotiating room sales will be held. For example, a merchant could allow buyers reviewing featured items on the merchant's website to leave an indication with the merchant that the buyer would like to participate in the on-line group-buying sale in the negotiating room when the merchant begins such a sale. Accordingly, the merchant may send an e-mail to the buyer a day prior to the initiation of a half-hour on-line group-buying sale for the featured item that notifies the buyer that the featured item will be sold in the negotiating room at a particular time.

As an ordinarily skilled artisan will recognize, all the embodiments of the invention disclosed herein could be implemented in both home/consumer, business-to-business, and commercial/retail embodiments. For example, the cable television embodiment, including the display 1300 could be included in a kiosk, such as a stand located in a public shopping area, e.g., a mall or a store. Of course, other embodiments of the invention are also amenable to being placed in a kiosk.

Figure 14:
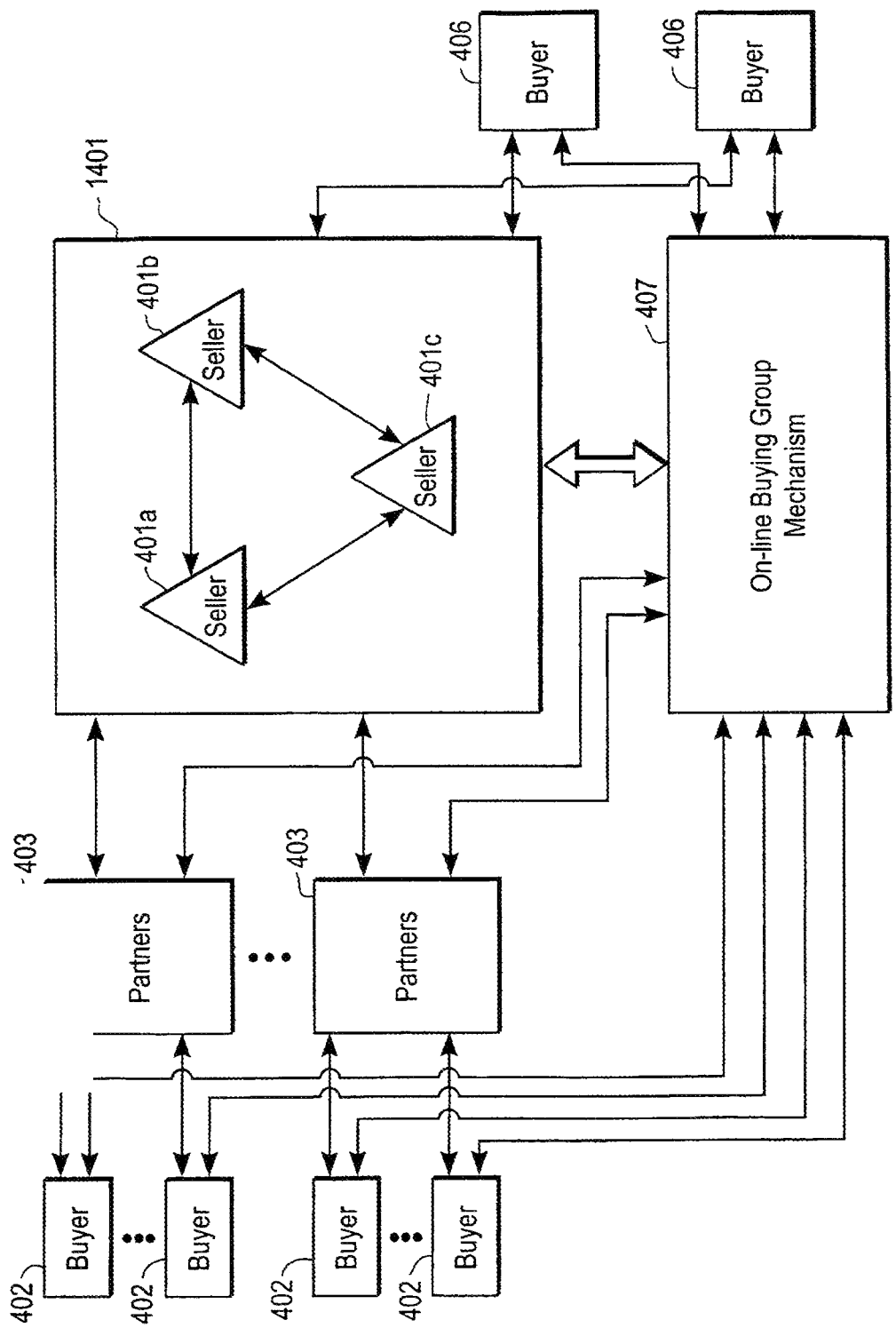
FIG. 14 illustrates a sample multiple seller negotiation room 1401, according to an alternate embodiment of the invention.

FIG. 14 illustrates a sample multiple seller negotiation room 1401, according to an alternate embodiment of the invention. The multiple seller negotiation room 1401 allows multiple sellers 401*a*, 401*b*, 401*c* to communicate with each other and with the buyers 402, 404, and 406. In the multiple seller negotiation room 1401, the buyers 402, 404, and 406 may send the same communication to all participating sellers, i.e., "throw in free service for year, and I'll buy one." (The buyers may also send similar communications in the other multiple seller embodiments.) The buyers 402, 404, and 406 may also send communications to a particular seller, e.g., the seller 401*b*.

Communications between the buyers 402, 404, and 406 may cause one or more of the sellers 401*a*, 401*b*, 401*c* to alter one or more characteristics of an ongoing on-line group-buying sale, just as communications in the single seller negotiation room embodiment could prompt one or more sellers 401*a*, 401*b*, 401*c* to alter an ongoing sale in the on-line group-buying mechanism 407. In all other respects, this embodiment operates in the manner previously disclosed. Of course, the multiple seller negotiating room 1401 may operate in a manner similar to that described for the merchant embodiment described in FIGS. 9A-9E. Such a multiple seller negotiating room could be operated by a single sales representative operating on behalf of all the participating sellers and/or could be operated by multiple sellers representatives competing against each other. Thus, the negotiating room 1401 would typically operate with the cooperation of multiple sellers or in a predetermined format that would condition the sellers' behaviors in the negotiating room 1401, e.g., one seller could not "hijack" the sale.

Figure 15:
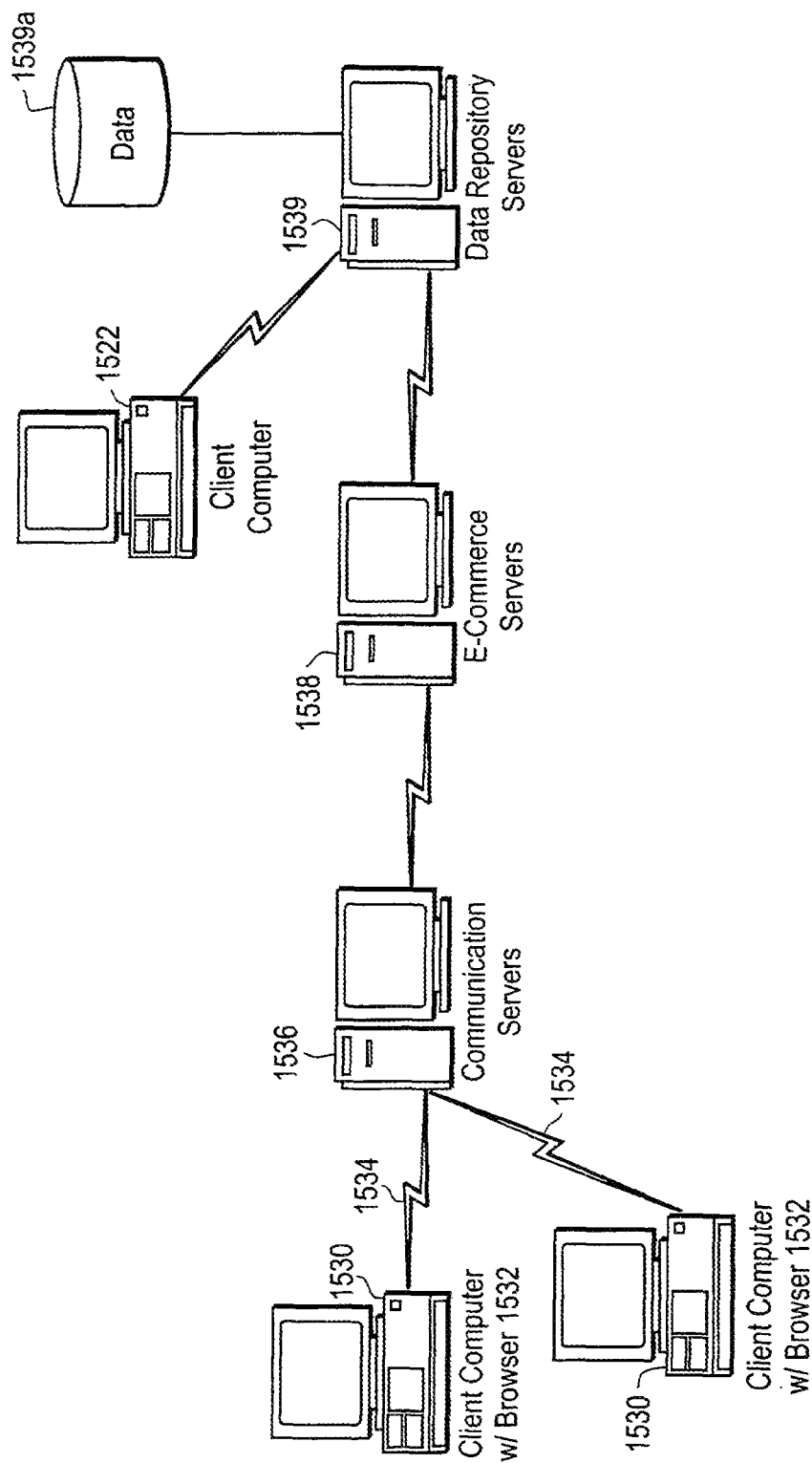
FIG. 15 is a block diagram of an exemplary inter-networked computer system configured to implement an embodiment of the invention.
Figure 16:
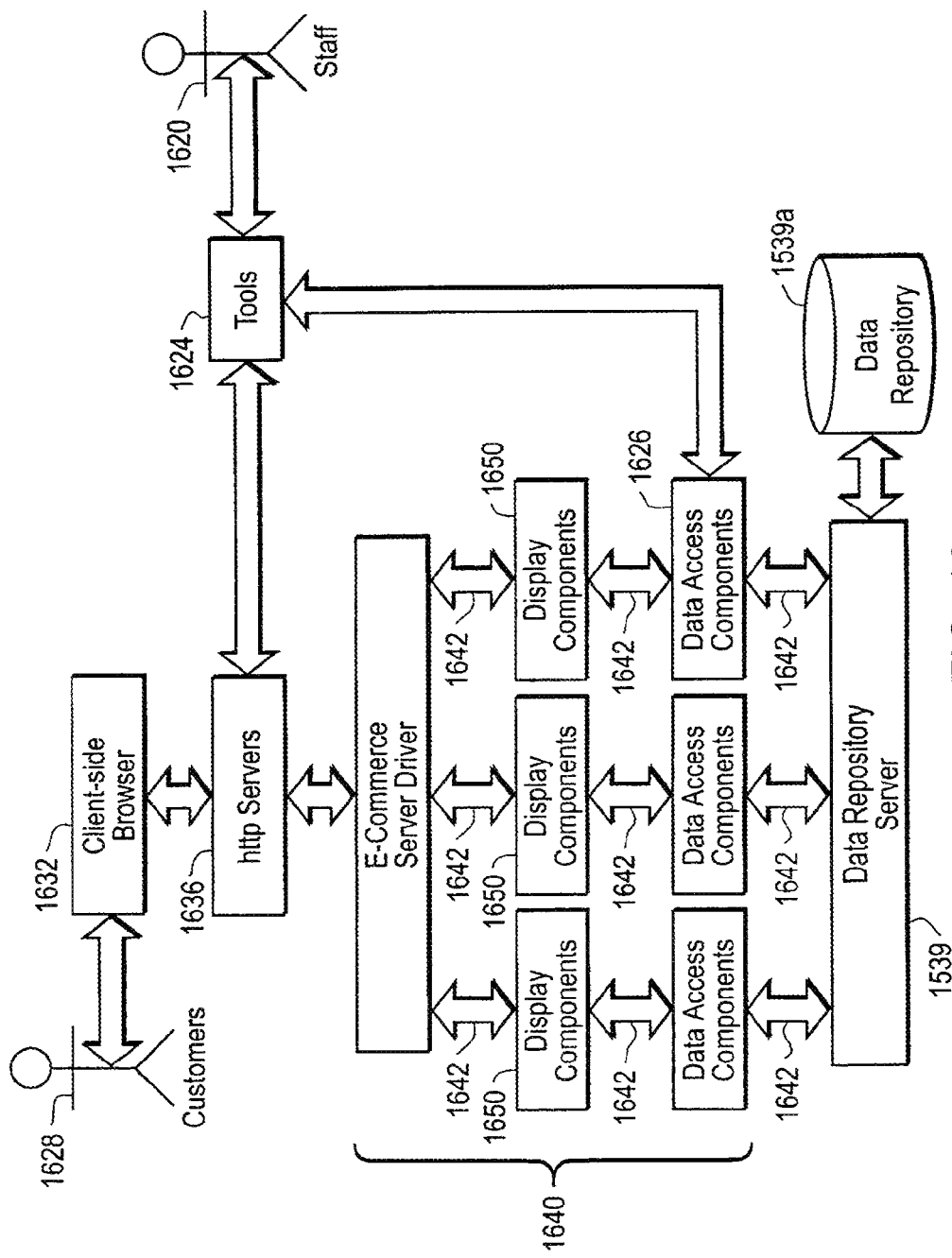
FIG. 16 is a block diagram of exemplary software components configured to implement an embodiment of the invention.

Various hardware and software configurations may be used to provide the on-line group-buying mechanism and the negotiating room. As shown in FIGS. 15, 16, and 17 according to an embodiment of the invention, merchandising and yield management staff 1620 may define an on-line group-buying sale using a client computer 1522 and client software 1624, comprising a set of tools. The tools 1624 communicate with server processes 1626 (e.g. data access components), including but not limited to data repository processes, to enter the data relevant to each on-line group-buying sale into a data repository 1539*a* via a data repository server(s) 1539, according to an embodiment of the invention. A database represents an exemplary data repository.

A customer (e.g., a buyer) 1628 may access the on-line group-buying sale and/or the negotiating room using a client computer 1530 running a browser 1532 or through some other type of client computer program, according to an embodiment of the invention. The client computer program 1532 typically communicates via some means of physical communication layer 1534, e.g., the Internet, with a server 1536, e.g., an HTTP server, or a server with similar purpose. The physical communication layer 1534 may include, of course, wireless communications. The server 1536 further communicates, using public or proprietary protocols, with one or more e-commerce server(s) 1538, which may contain software for implementing the on-line group-buying mechanism as well as the negotiating room, according to an embodiment of the invention. The ecommerce server 1538 may in turn communicate with (access/update data from) the data repository server 1539, which interacts with the data repository 1539*a*, according to an embodiment of the invention.

The e-commerce server 1538 software and related components may comprise a set of server processes 1640, a means 1642 of communication between the server processes 1640, and the data repository 1539*a* (via the data repository server 1539) to hold data significant to the process of taking offers and otherwise interacting with the customer 1628. The capabilities of the e-commerce server software and related components may extend far beyond the ability to handle on-line group-buying sales.

As shown in FIG. 17, an on-line group-buying mechanism comprises a set of data repository tables 1750 that define the properties of the on-line group-buying sale(s), a set of program subroutines 1752 and server processes 1754 and 1756 that define the logical processing for managing on-line group-buying sales and their interactions with buyers, and data contained in the data repository tables 1750 defining the values of the properties that define each on-line group-buying sale, according to an embodiment of the invention. For example, the tables 1750 may contain data that defines price curves. The data repository 1539*a* and the data repository 1750 may comprise an integrated (e.g., single) data repository in some embodiments of the invention.

Embodiments of the invention may further include a help system, including a wizard that provides assistance to seller's representatives and staff responsible for configuring the negotiating room and its various components.

Embodiments of the invention using a cable television electronic network and/or an interactive cable television network may be developed for operation with any acceptable cable format and/or standard, as an ordinarily skilled artisan will recognize. For example, embodiments of the invention may be compatible with communications transmitted in accordance with the Advanced Television Enhancement Forum "ATVEF" specification and standards such as ATSC, DVB, OpenCable, SMPTE, PAL, SECAM, and IETF standards/specifications.

Embodiments of the invention using a wireless voice and/or data electronic network may be developed for operation with any acceptable wireless format, as an ordinarily skilled artisan will recognize. For example, embodiments of the invention may be compatible with communications transmitted in accordance with the Short Messaging Service ("SMS") and the Wireless Application Protocol ("WAP") specifications and standards, such as HDML, WML, CDPD, CDMA, GSM.

The websites, operator's sites, partner's sites, and seller's sites, along with their related functions may be written for operation on any computer operating system and for operation in any computing environment. In addition, the on-line group-buying mechanism and the negotiating room may be designed using CORBA, COM+, ACTIVEX™ controls, and/or Java. According to one embodiment of the invention, Java applets may provide a plug-in on-line group-buying mechanism and/or a negotiating room for use with another application on both a single computer and in a networked embodiment.

The on-line group-buying mechanism's screens and the negotiating room displays, such as the sample user interface 701, may be displayed using any application user interface techniques but will preferably utilize the "what-you-see-is-what-you-get" ("WYSIWYG") display paradigm. One of ordinary skill in the art may easily recognize numerous alternate approaches to providing a user interface to receive the information needed to support an on-line group-buying mechanism.

Under embodiments of the invention, a remote buyer computing system having browsing software may communicate with the on-line group-buying mechanism and/or the negotiating room via Hypertext Markup Language ("HTML") documents, Dynamic Hypertext Mark-Up Language ("DHTML") documents, Extensible Mark-Up Language ("XML") documents, and/or other similar formats over an electronic network, such as the World Wide Web. A remote computing system associated with the on-line group-buying mechanism and/or the negotiating room may further utilize protocols such as SNMP, TCP/IP, and UDP/IP in order to send instructions and otherwise communicate with various other components of an on-line group-buying mechanism and/or the negotiating room. The on-line group-buying mechanism system and/or negotiating room may operate with protocols and languages in addition to those specifically disclosed herein. Similarly, the on-line group-buying mechanism and/or negotiating room may be developed using an object-oriented programming methodology or using any other programming methodology that results in a computing system having equivalent functionality.

Embodiments of the invention have been discussed in terms of computer programs but is equally applicable for systems utilizing hardware that performs similar functions, such as application specific integrated circuits ("ASICs").

An ordinary artisan should require no additional explanation in developing the methods and systems described herein but may nevertheless find some possibly helpful guidance in the preparation of these methods and systems by examining standard reference works in the relevant art.

All U.S. patents and applications are incorporated herein by reference as if set forth in their entirety.

Embodiments of the invention has been discussed in terms of products/services offered for sale by an on-line group-buying mechanism and/or via a negotiating room. Of course, other embodiments of the invention are application to the sales of goods/services using other business methods, including but not limited to the sale of goods by auction.

These and other changes can be made to the invention in light of the above detailed description. In general, in the following claims, the terms used should not be construed to limit the invention to the specific embodiments disclosed in the specification and the claims, but should be construed to include all electronic commerce methods and systems that operate under the claims set forth herein below. Accordingly, the invention is not limited by the disclosure, but instead its scope is to be determined entirely by the following claims.

The invention claimed is:

1. A non-transitory computer-readable medium storing executable instructions that, when executed, cause a computer to perform operations for an on-line group-buying sale, comprising:
   providing communication support for a plurality of on-line group-buying sales in a negotiating room;
   conducting a first on-line group-buying sale of a featured item in association with the negotiating room, wherein the featured item includes products and/or services;
   providing a flash demand curve for the featured item using hypothetical offers received from the first on-line group-buying sale;
   providing a sale demand curve associated with the flash demand curve; and
   conducting a second on-line group-buying sale of the featured item using the sale demand curve.

2. The non-transitory computer readable medium of claim 1, storing further executable instructions that, when executed, cause the computer to perform further operations comprising:
   conducting a third on-line group-buying sale in association with the negotiating room; and
   providing another flash demand curve for the featured item using hypothetical offers received from the third on-line group-buying sale; and
   wherein the sale demand curve is further associated with the another flash demand curve.

3. The non-transitory computer readable medium of claim 2, storing further executable instructions that, when executed, cause the computer to perform further operations comprising:
   modifying the featured item during the third on-line group-buying sale to include at least another product and/or service; and
   receiving an identification of the products and/or services included in the featured item for the second on-line group-buying sale before conducting the second on-line group-buying sale.

4. The non-transitory computer readable medium of claim 1, storing further executable instructions that, when executed, cause the computer to perform further operations comprising:
   providing another flash demand curve for the featured item associated with the second on-line group-buying sale;
   initiating the second on-line group-buying sale before the first on-line group-buying sale; and
   replacing the another flash demand curve with the sale demand curve.

5. The non-transitory computer readable medium of claim 1, storing further executable instructions that, when executed, cause the computer to perform further operations comprising:
   providing at least one communication via the negotiation room; and
   wherein the first on-line group-buying sale includes a second featured item.

6. The non-transitory computer readable medium of claim 1, storing further executable instructions that, when executed, cause the computer to perform further operations comprising:
   storing the flash demand curve in a data repository.

7. A system for selling featured items, comprising:
   a processor; and
   a memory configured to communicate with the processor, the memory including instructions stored thereon that, when executed, cause the processor to perform operations comprising:
   providing communication support for a plurality of on-line group-buying sales in a negotiating room;
   conducting a first on-line group-buying sale of a featured item in association with the negotiating room, wherein the featured item includes products and/or services;
   providing a flash demand curve for the featured item using hypothetical offers received from the first on-line group-buying sale;
   providing a sale demand curve associated with the flash demand curve; and
   conducting a second on-line group-buying sale of the featured item using the sale demand curve
   a negotiating room stored on a computer readable medium and configured to conduct an on-line group-buying sale of featured items, wherein the negotiating room comprises a voting mechanism configured to calculate at least one flash demand curve for the featured items using offers; and an on-line group-buying mechanism stored on a computer readable medium and configured to facilitate a sale of the featured items using a sale demand curve developed from the at least one flash demand curve.

8. The system of claim 7, wherein the negotiating room further comprises:

a message receiver and transmitter configured to receive communications wherein at least some of the communications include the hypothetical offers for the featured items.

9. The system of claim 7, wherein the on-line group-buying mechanism begins selling the featured items using an initial demand curve before the on-line group-buying sale in the negotiating room begins, the system further comprising:

a seller representative stored on a computer readable medium and configured to send an instruction to the on-line group-buying mechanism to replace the initial demand curve with the sale demand curve.

10. A non-transitory computer-readable medium storing executable instructions that, when executed, cause a computer to execute data processing, comprising:

determining demand for a featured item during an on-line group-buying sale;

conducting a first on-line group-buying sale associated with a negotiating room;

providing at least one flash demand curve for the featured item using hypothetical offers received from the first on-line group-buying sale;

providing the at least one flash demand curve to create a sale demand curve for the featured item; and initiating a second on-line group-buying sale of the featured item using the sale demand curve.

11. The non-transitory computer readable medium of claim 1, wherein the hypothetical offers received from the first on-line group-buying sale are irrevocable purchase offers.

12. The non-transitory computer readable medium of claim 1, wherein the hypothetical offers received from the first on-line group-buying sale include revocable purchase offers.

13. The non-transitory computer readable medium of claim 1, comprising further executable instructions that, when executed, cause the computer to perform further operations comprising providing an a second hypothetical offer for another featured item, wherein the flash demand curve includes an indication of the second hypothetical offer.

14. The non-transitory computer readable medium of claim 1, wherein the hypothetical offers comprise real-time offers.

15. The non-transitory computer readable medium of claim 1, comprising further executable instructions that, when executed, cause the computer to perform further operations comprising continuously updating the flash demand curve.

16. The non-transitory computer readable medium of claim 1, comprising further executable instructions that, when executed, cause the computer to perform further operations comprising updating the flash demand curve at predetermined time intervals.

17. The non-transitory computer readable medium of claim 1, wherein the flash demand curve depicts a demand for the featured item among a group of prospective buyers within a predetermined time period.

18. The non-transitory computer readable medium of claim 1, comprising further executable instructions that, when executed, cause the computer to perform further operations comprising modifying a price of the featured item in the second on-line group-buying sale.

19. The non-transitory computer readable medium of claim 1, comprising further executable instructions that, when executed, cause the computer to perform further operations comprising including an additional item with the featured item in the second on-line group-buying sale.

20. The non-transitory computer readable medium of claim 1, wherein the sale demand curve comprises completed sales of the at least one of a revocable or irrevocable offer received from the first on-line group-buying sale.

21. The computer readable medium of claim 1, further comprising converting the hypothetical offers to at least one of a revocable or irrevocable offer.

* * * * *